(12) United States Patent
Taneja et al.

(10) Patent No.: US 10,966,138 B2
(45) Date of Patent: Mar. 30, 2021

(54) DATA COMMUNICATION AND RESOURCE MANAGEMENT IN HYBRID INFRASTRUCTURE AND NEIGHBOR AWARENESS NETWORKING NETWORKS

(71) Applicant: Cisco Technology, Inc., San Jose, CA (US)

(72) Inventors: Mukesh Taneja, Bangalore (IN); Sudhir K. Jain, Fremont, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/380,126

(22) Filed: Apr. 10, 2019

(65) Prior Publication Data

US 2020/0329416 A1 Oct. 15, 2020

(51) Int. Cl.
*H04W 40/02* (2009.01)
*H04W 40/32* (2009.01)
*H04W 84/18* (2009.01)
*H04W 84/12* (2009.01)

(52) U.S. Cl.
CPC .......... *H04W 40/02* (2013.01); *H04W 40/32* (2013.01); *H04W 84/12* (2013.01); *H04W 84/18* (2013.01)

(58) Field of Classification Search
CPC . H04W 28/0252; H04W 84/12; H04W 48/14; H04W 72/1221; H04W 40/02; H04W 40/32; H04W 84/18
See application file for complete search history.

(56) References Cited

U.S. PATENT DOCUMENTS

| 10,129,900 | B2 | 11/2018 | Park et al. | |
|---|---|---|---|---|
| 2011/0261747 | A1* | 10/2011 | Wang | H04W 72/1221 370/315 |
| 2011/0296064 | A1* | 12/2011 | Ehsan | H04L 47/30 710/57 |
| 2012/0329555 | A1* | 12/2012 | Jabara | G07F 17/3218 463/29 |
| 2014/0066018 | A1* | 3/2014 | Zhu | H04L 63/107 455/411 |

(Continued)

FOREIGN PATENT DOCUMENTS

WO 2016190721 A1 12/2016

OTHER PUBLICATIONS

Neighbor Awareness Networking Specification Version 3.0, 2018 Wi-Fi Alliance, 204 pages.

*Primary Examiner* — Benjamin H Elliott, IV
*Assistant Examiner* — Prince A Mensah
(74) *Attorney, Agent, or Firm* — Patterson + Sheridan, LLP

(57) ABSTRACT

Techniques for routing data in a wireless communication network including a hybrid of infrastructure wireless local area network (WLAN) and neighbor awareness networking (NAN). A subscription is identified between a first NAN device in a first NAN cluster in the network and a second NAN device in a second NAN cluster in the network. The first NAN cluster includes at least one NAN device not included in the second NAN cluster. A first path is generated between the first NAN device and the second NAN device. The first path includes a first network access point (AP) in the network. Data is transmitted from the first NAN device to the second NAN device using the first path comprising the first AP.

20 Claims, 21 Drawing Sheets

(56) References Cited

U.S. PATENT DOCUMENTS

| | | |
|---|---|---|
| 2016/0029403 A1 | 1/2016 | Roy et al. |
| 2016/0150459 A1* | 5/2016 | Patil .................... H04W 40/02 |
| | | 370/328 |
| 2016/0353470 A1 | 12/2016 | Liu et al. |
| 2017/0289994 A1 | 10/2017 | Kim et al. |
| 2018/0139275 A1* | 5/2018 | Abraham .............. H04W 48/14 |
| 2019/0037433 A1* | 1/2019 | Nagasaka ......... H04W 28/0252 |

* cited by examiner

US 10,966,138 B2

DATA COMMUNICATION AND RESOURCE MANAGEMENT IN HYBRID INFRASTRUCTURE AND NEIGHBOR AWARENESS NETWORKING NETWORKS

TECHNICAL FIELD

Embodiments presented in this disclosure relate generally to wireless networking, and more specifically, though not exclusively, to data communication and network resource management in hybrid infrastructure wireless local area networks (WLAN) and neighbor awareness networking (NAN) networks.

BACKGROUND

Many existing wireless networks operate using an infrastructure wireless local area network (WLAN) architecture, in which a network access point (AP) is used to facilitate wireless communication between wireless stations (e.g., end user devices). Infrastructure WLAN is also sometimes referred to as infrastructure basic server set (BSS). Alternative network architectures are becoming more and more common, including device-to-device (D2D) networks. One example of a D2D network is a NAN. NAN allows device-to-device wireless communication, without requiring the support of WLAN infrastructure nodes like APs.

Some networks operate as hybrid, including both aspects of infrastructure WLAN (e.g., using APs) and aspects of NAN (e.g., device-to-device communication, without use of an AP, for some network nodes). These networks, however, are often inefficient in their data communication and use of network resources. It is desirable to improve data communication and resource management in these hybrid networks, to take advantage of the technologies provided both by infrastructure WLAN and NAN.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
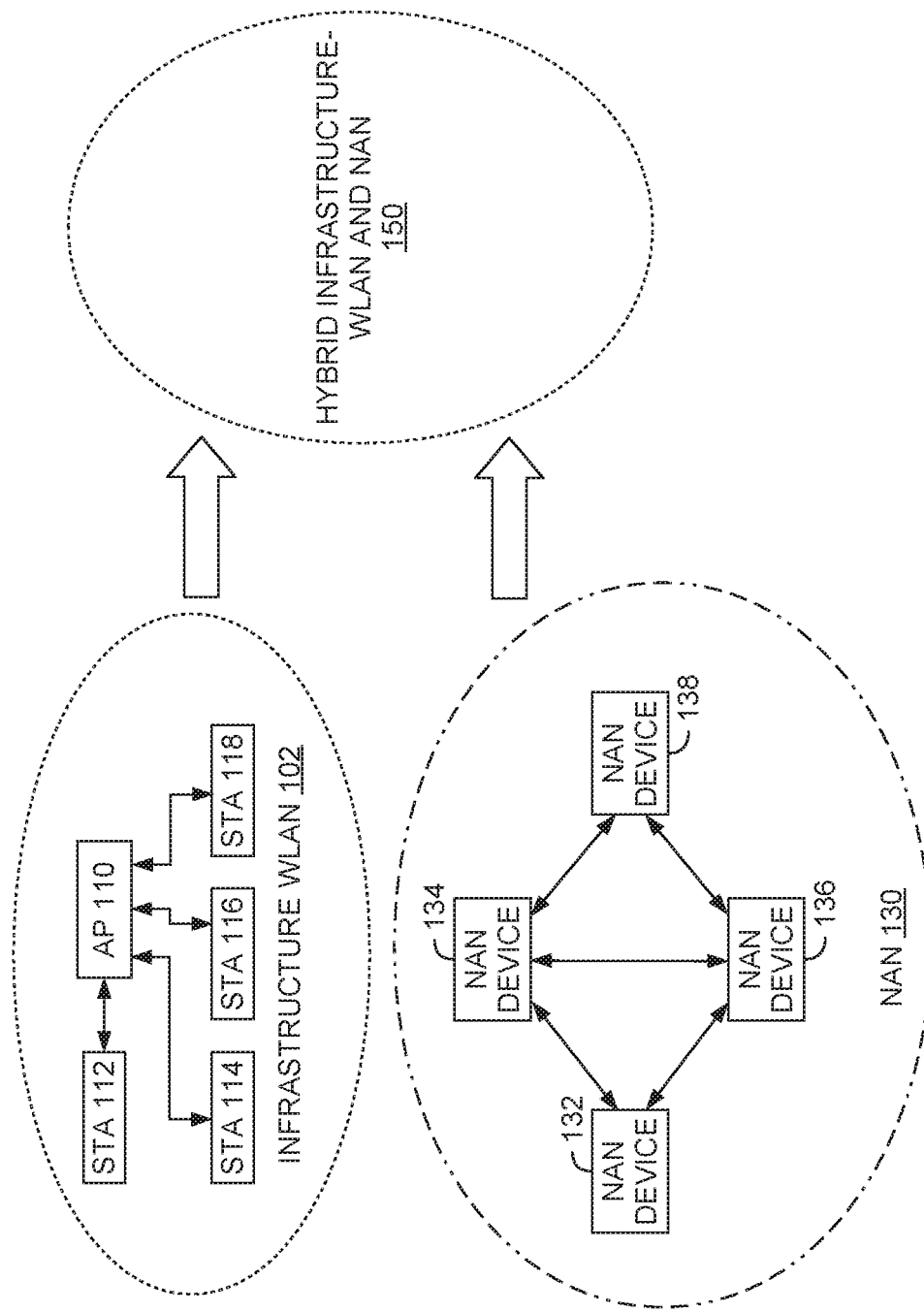
FIGS. 1A-1B illustrates a hybrid infrastructure WLAN and NAN network, according to one embodiment described herein.

One embodiment presented in this disclosure provides a method for routing data in a wireless communication network including a hybrid of infrastructure wireless local area network (WLAN) and neighbor awareness networking (NAN). The method includes identifying a subscription between a first NAN device in a first NAN cluster in the network and a second NAN device in a second NAN cluster in the network. The first NAN cluster includes at least one NAN device not included in the second NAN cluster. The method further includes generating a first path between the first NAN device and the second NAN device, the first path including a first network access point (AP) in the network. The method further includes transmitting data from the first NAN device to the second NAN device using the first path comprising the first AP.

Another embodiment presented in this disclosure provides a computer program product for routing data in a wireless communication network including a hybrid of infrastructure WLAN and NAN. The computer program product includes a computer-readable storage medium having computer-readable program code embodied therewith, the computer-readable program code executable by one or more computer processors to perform an operation. The operation includes identifying a subscription between a first NAN device in a first NAN cluster in the network and a second NAN device in a second NAN cluster in the network. The first NAN cluster includes at least one NAN device not included in the second NAN cluster. The operation further includes generating a first path between the first NAN device and the second NAN device, the first path including a first network AP in the network. The operation further includes transmitting data from the first NAN device to the second NAN device using the first path comprising the first AP.

Another embodiment presented in this disclosure provides a system. The system includes a processor and a memory storing a program, which, when executed on the processor, performs an operation. The operation includes identifying a subscription between a first NAN device in a first NAN cluster in a wireless communication network and a second NAN device in a second NAN cluster in the network. The first NAN cluster includes at least one NAN device not included in the second NAN cluster. The operation further includes generating a first path between the first NAN device and the second NAN device, the first path including a first network AP in the network. The operation further includes transmitting data from the first NAN device to the second NAN device using the first path comprising the first AP.

EXAMPLE EMBODIMENTS

Device-to-device networks allow for device-to-device wireless communication without the use of infrastructure nodes, like APs. For example, NAN is one example of a D2D network. The disclosure herein will focus on NAN as one example of a D2D network, but the described techniques are equally applicable to other D2D networks. Current versions of NAN allow for integration with infrastructure WLAN, but do not take advantage of APs or other infrastructure elements. Data communication and resource management in hybrid infrastructure WLAN and NAN networks can be improved with a variety of enhancements, as described in one or more embodiments disclosed herein.

For example, NAN data transmission can be routed through an infrastructure WLAN AP, in certain circumstances, to improve the efficiency of data communication in hybrid infrastructure WLAN and NAN networks. This is discussed in more detail with regard to FIGS. 3-6, and 14-15, disclosed herein. As another example, resource management in hybrid infrastructure WLAN and NAN networks can be improved through enhancements to messaging between NAN devices and infrastructure WLAN APs. This is discussed further with regard to FIGS. 7-13, disclosed herein. For example, the network topology of the NAN network can be identified and used by an AP to improve both upload and download resource management and data communication.

Figure 1B:
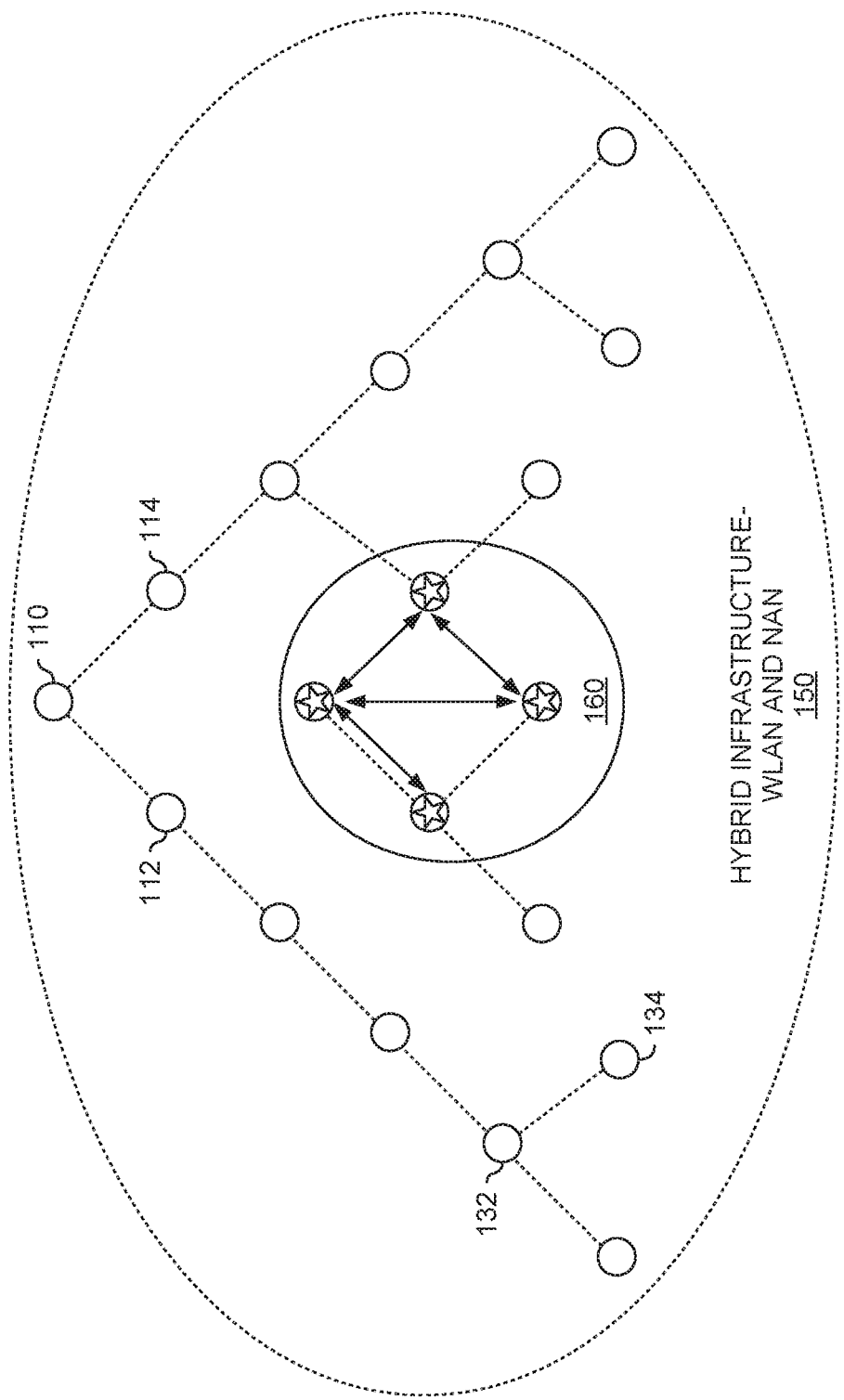

FIGS. 1A-1B illustrates a hybrid infrastructure WLAN and NAN network, according to one embodiment described herein. In FIG. 1A, an infrastructure WLAN network 102 includes an AP 110 and four stations (STAs) 112, 114, 116, and 118. In an embodiment, the STAs 112, 114, 116, and 118 can be any suitable wireless network station, including a laptop or desktop computer, a workstation or server, a smartphone, a tablet, an Internet of Things (IoT) device, or any other suitable STA. The AP 110 is wirelessly connected to each of the STAs 112, 114, 116, and 118 using a suitable wireless network connection, including WLAN (e.g., an 802.11ax connection), a cellular radio connection, or any other suitable wireless technology.

As illustrated in FIG. 1A, a NAN network 130 includes four NAN devices 132, 134, 136, and 138. In an embodiment, the NAN devices 132, 134, 136, and 138 can also be any suitable wireless network station, including a laptop or desktop computer, a workstation or server, a smartphone, a tablet, an Internet of Things (IoT) device, or any other suitable NAN device. The NAN devices 132, 134, 136, and 138 are wirelessly connected to each other using a suitable wireless network connection, including WiFi (e.g., an 802.11.x connection), or any other suitable wireless technology. In an embodiment, the infrastructure WLAN network 102 is combined with the NAN network 130 to form a hybrid infrastructure-WLAN and NAN network 150.

FIG. 1B illustrates the hybrid infrastructure-WLAN and NAN network 150 in more detail. In an embodiment, an AP 110 is wireless connected to STAs 112 and 114. The STAs 112 and 114 are associated both with the AP 110 and with NAN devices. For example, the STAs 112 and 114 are both associated with the AP 110, and the STAs 112 and 114 can communicate with one or more devices of NAN data cluster 160, either directly or via other devices illustrated in FIG. 1B. The NAN data cluster 160 is made up of NAN devices, none of which are directly connected with the AP 110. The hybrid infrastructure-WLAN and NAN network 150 further includes NAN devices 132 and 134 which are wirelessly connected to each other, but are not directly connected to the AP 110 or the STAs 112 and 114.

Figure 2:
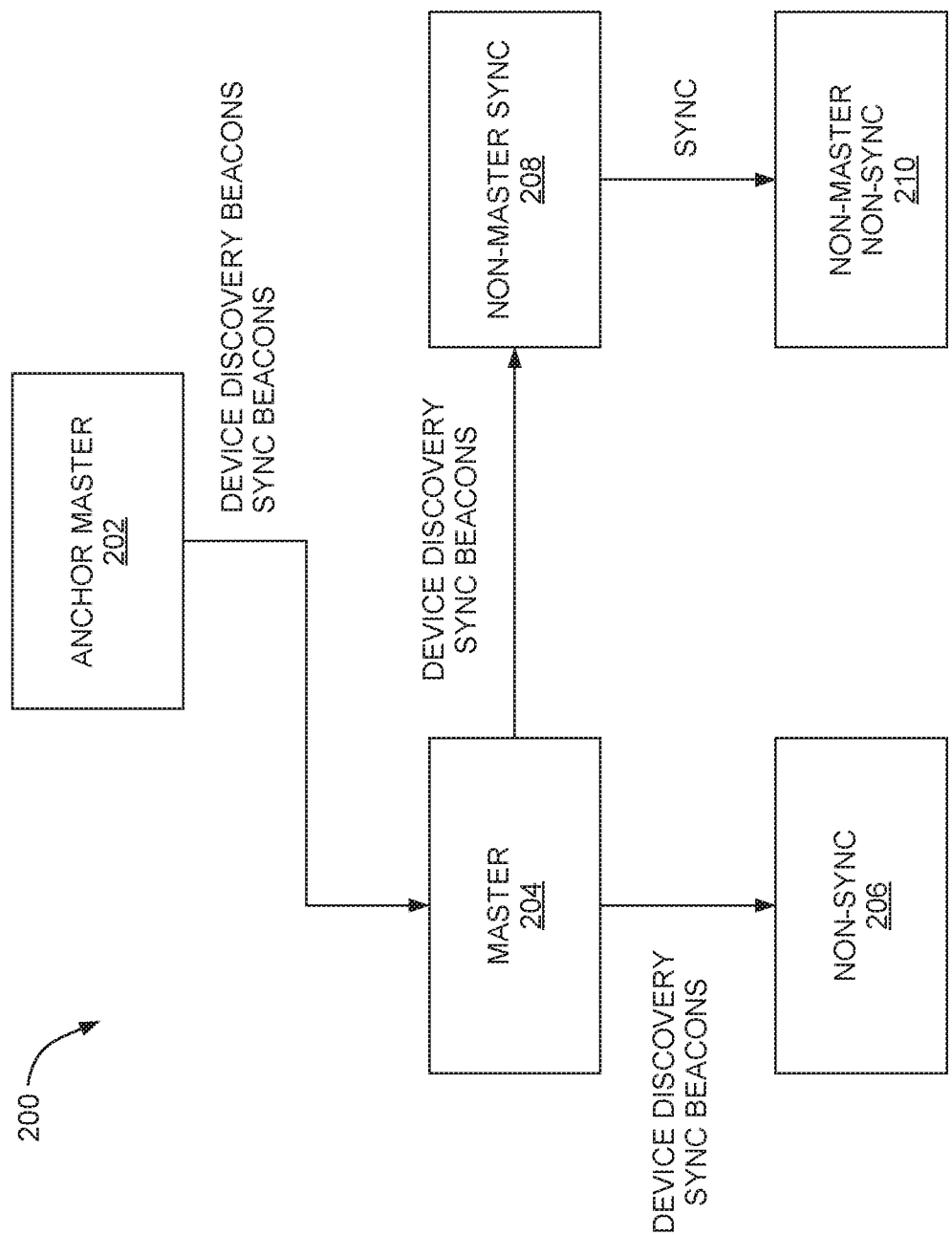
FIG. 2 illustrates a NAN network, according to one embodiment described herein.

FIG. 2 illustrates a NAN network, according to one embodiment described herein. As discussed above, NAN facilitates device-to-device communication without requiring infrastructure nodes like APs. NAN is sometimes referred to as WiFi-Aware. The term NAN is used herein for convenience, but the techniques disclosed apply equally to both NAN and WiFi-Aware, and to any other suitable device-to-device communication architectures (e.g., proprietary architectures from device or system manufacturers, other device-to-device standards, etc.).

In an embodiment, a NAN network 200 includes an anchor master device 202, a master device 204, a non-sync device 206, a non-master sync device 208, and a non-master, non-sync device 210. The NAN network 200 uses a number of beacons, including discovery beacons to help discover NAN clusters, synchronization beacons used for timing synchronization, service discovery beacons used to help discovery available services. In an embodiment, NAN does not mandate a particular data plane, allowing numerous potential options to be used. Further details regarding NAN are provided in the Neighbor Awareness Network Specification, available from the WiFi alliance.

As illustrated in FIG. 2, the anchor master device 202 transmits discovery and sync beacons to other devices in the NAN network 200. The master device 204 propagates NAN discovery and synchronization beacons. The non-master sync device 208 propagates synchronization beacons. The non-master non-sync device 210 does not propagate any of these beacons.

Figure 3A:
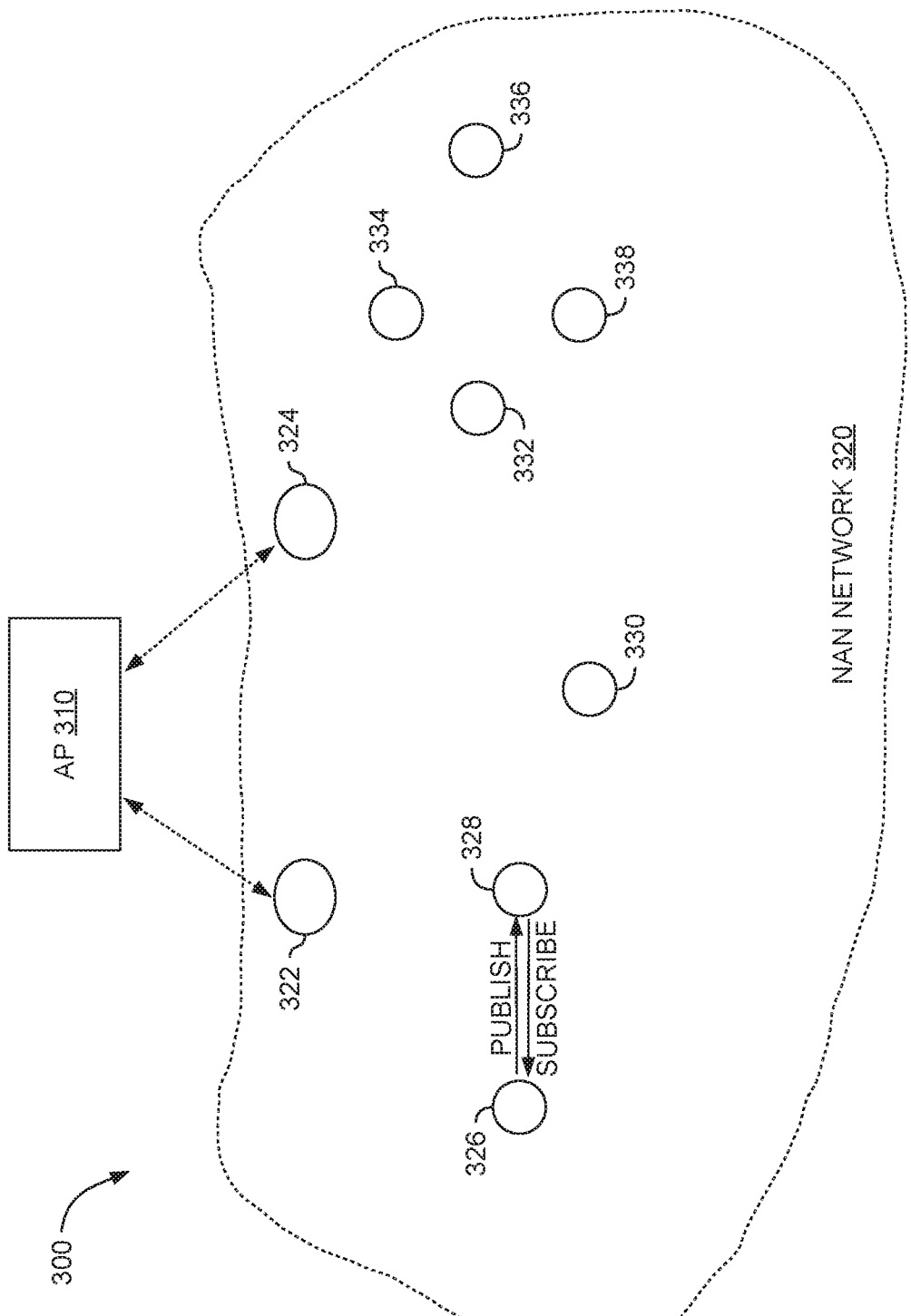
FIGS. 3A-3D illustrate data communication in a hybrid infrastructure WLAN and NAN network, according to one embodiment described herein.

FIGS. 3A-3D illustrate data communication in a hybrid infrastructure WLAN and NAN network, according to one embodiment described herein. As illustrated in FIG. 3A, a network 300 includes both an AP 310 and a NAN network 320. The AP 310 is associated with two wireless STAs 322 and 324. In an embodiment, as discussed further below, the STAs 322 and 324 are both associated with the AP and act as part of the NAN network 320. In an embodiment, the STAs 322 and 324 can be any suitable wireless network station, including a laptop or desktop computer, a workstation or server, a smartphone, a tablet, an Internet of Things (IoT) device, or any other suitable STA. The AP 310 is wirelessly connected to each of the STAs 322 and 324 using a suitable wireless network connection, including WLAN (e.g., an 802.11ax connection), a cellular radio connection, or any other suitable wireless technology.

The NAN network 320 includes NAN devices 326, 328, 330, 332, 334, 336, and 338. In an embodiment, the STAs 322 and 324 are both associated with the AP 310 and act as NAN devices in the NAN network 320. In this embodiment, the NAN devices 326, 328, 330, 332, 334, 336, and 338 are not associated with the AP 310 and are not in wireless communication with the AP 310.

In an embodiment, NAN devices discover services offered by other NAN devices using a control channel and a publish/subscribe mechanism. A first NAN device advertises available services using a publish network message. A second NAN device subscribes to one or more of these services using a subscribe network message. For example, as illustrated in FIG. 3A, the NAN device 326 advertises available services using a publish message. The NAN device 328 receives the publish message, and responds with a subscribe message to the NAN device 326, subscribing to one or more of the offered services.

Figure 3B:
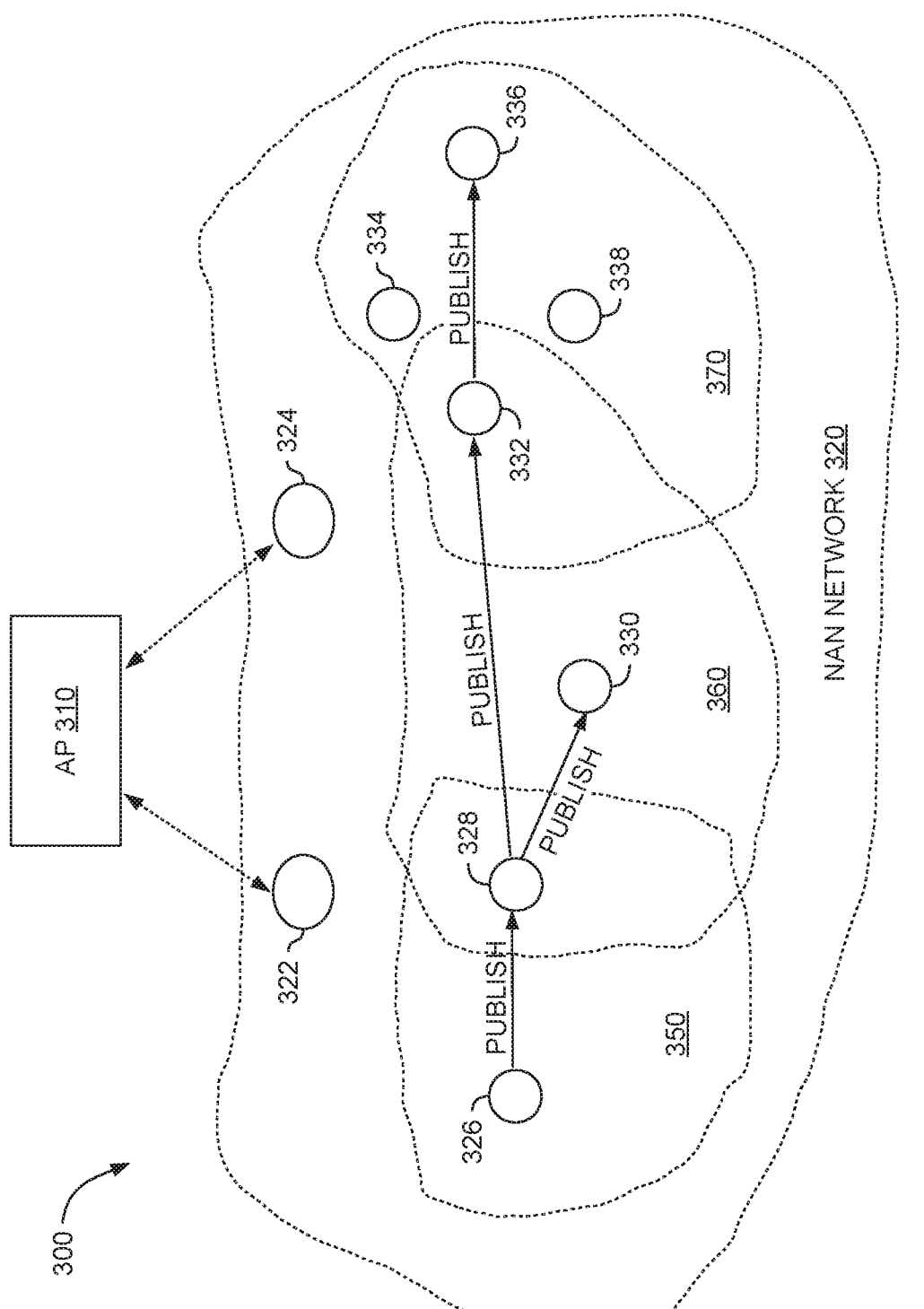

FIG. 3B further illustrates the publish/subscribe mechanism in the NAN network 320. The NAN network 320 includes three NAN clusters. A first NAN cluster 350 includes the NAN devices 326 and 328. A second NAN cluster 360 includes the NAN devices 328, 330, and 332. As illustrated in FIG. 3B, the NAN device 328 is part of both the NAN cluster 350 and the NAN cluster 360. A third NAN cluster 370 includes the NAN devices 332, 334, 336, and 338. The NAN device 332 is part of both the NAN cluster 360 and the NAN cluster 370.

In an embodiment, the NAN devices publish available services across clusters. For example, as illustrated in FIG. 3A, the NAN device 326 publishes available services to the NAN device 328. The NAN device 328 then transmits its own publish messages to the NAN devices 330 and 332. In an embodiment, the publish messages from the NAN device 328 describe both the services offered by the NAN device 328, and the services offered by the NAN device 326. The NAN device 332 transmits another publish message to the NAN device 336 (and other NAN devices in the NAN cluster 370), including the available services from NAN devices 326 and 328 (based on the publish message received from the NAN device 328), and the available services from the NAN device 332.

Figure 3C:
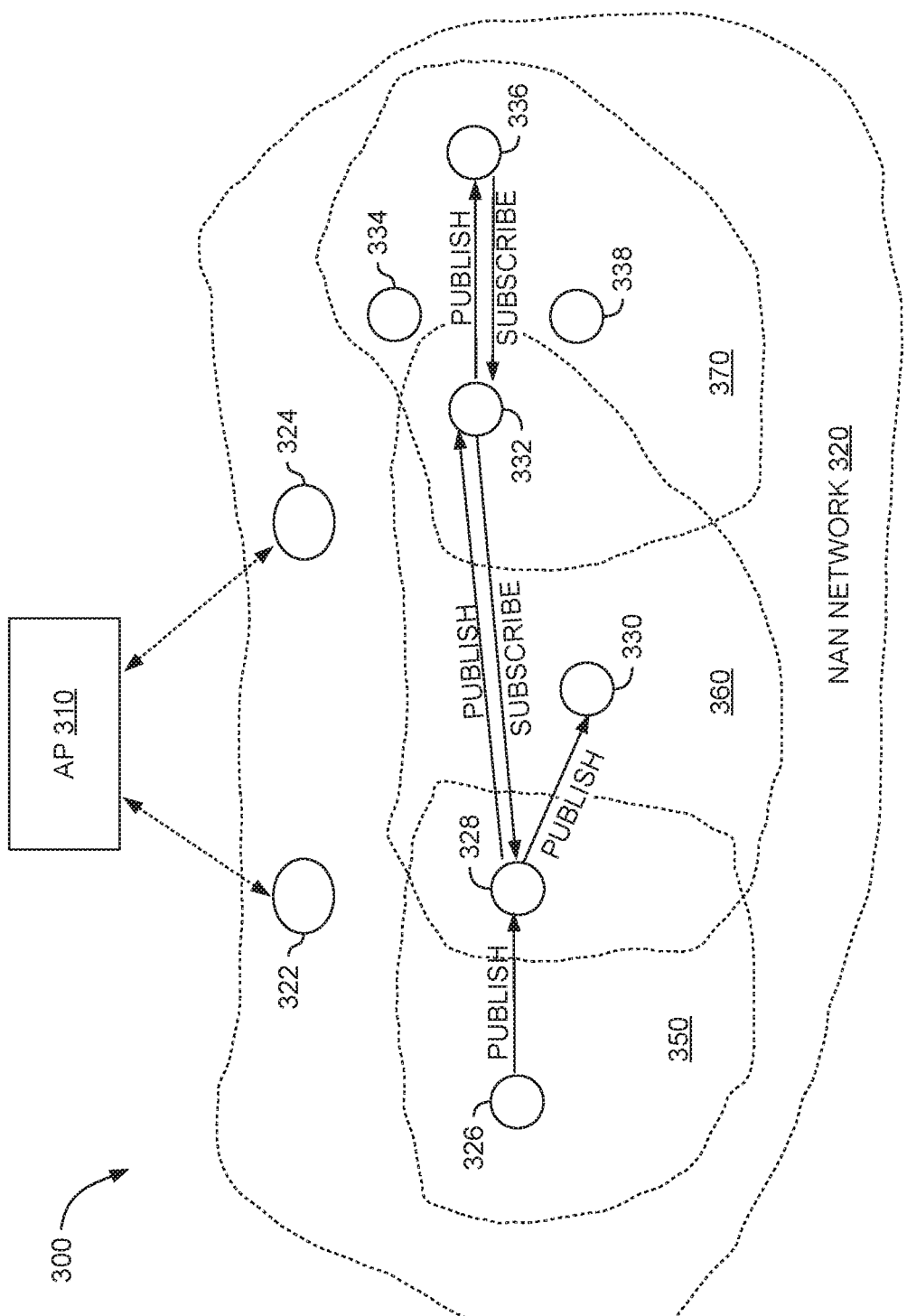

FIG. 3C illustrates subscribing to the services offered in the publish messages illustrated in FIG. 3B. For example, the NAN devices 332 and 336 each subscribe to one or more available services using a subscribe message. In an embodiment, the NAN device 336 subscribes to a service offered by 328: the NAN device transmits a subscribe message to the NAN device 332, which then forwards the subscription information to the NAN device 328. In this way the various NAN devices can subscribe to services offered across NAN clusters, without requiring a direct connection between the NAN devices.

Figure 3D:
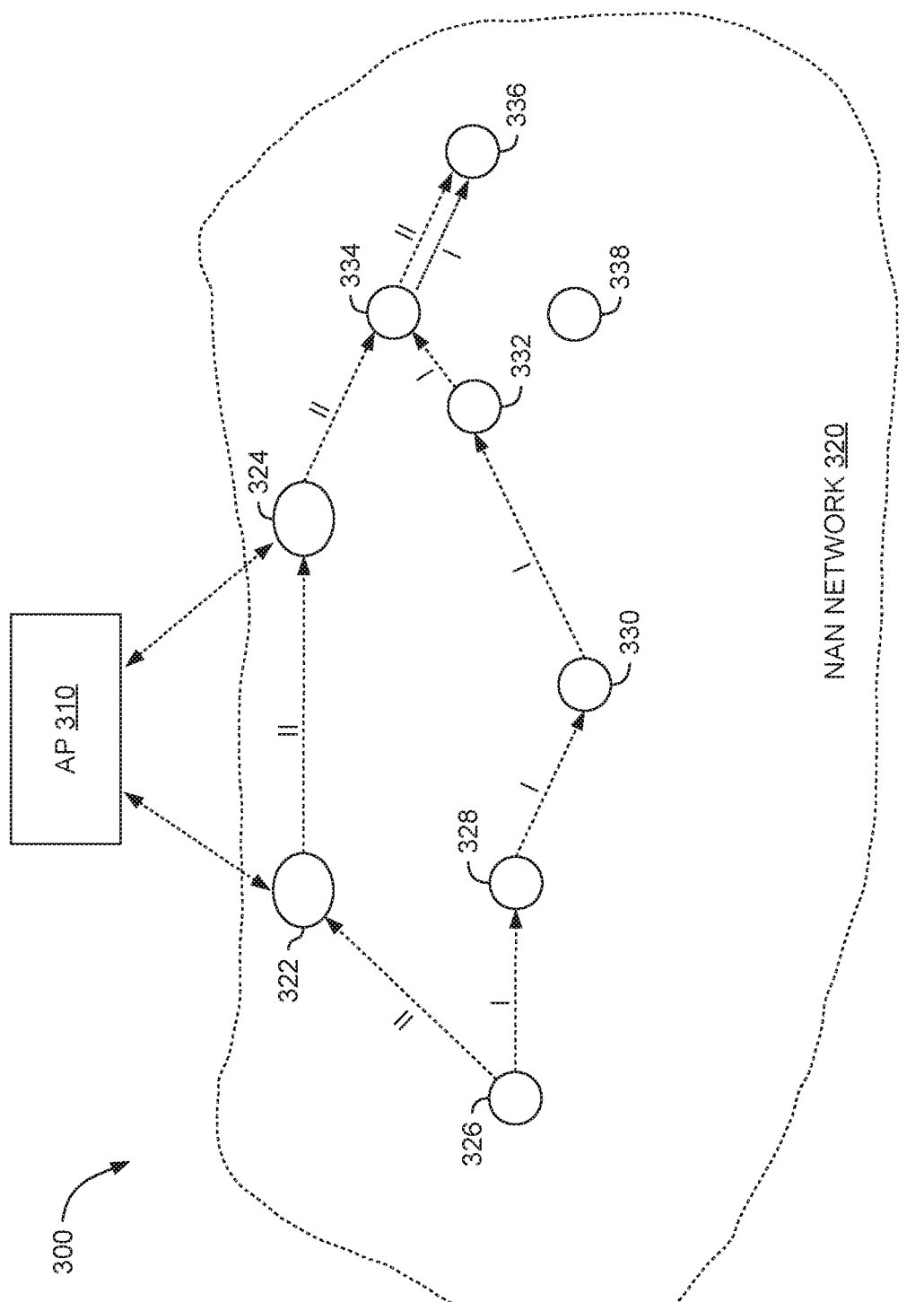

FIG. 3D illustrates data transmission between NAN devices in the NAN network 320, after NAN discovery operations. In an embodiment, the NAN device 326 transmits data to the NAN device 336. This data transmission can follow two potential paths. Path I flows from the NAN device 326, to the NAN device 328, to the NAN device 330, to the NAN device 332, to the NAN device 334, to the NAN device 336. Path II flows from the NAN device 326, to the STA 322 (e.g., acting as a NAN device also), to the STA 324 (e.g., acting as a NAN device also), to the NAN device 334, to the NAN device 336. In an embodiment, each of these paths is relatively inefficient, with data traversing many hops to travel from the NAN device 326 to the NAN device 336.

Figure 4:
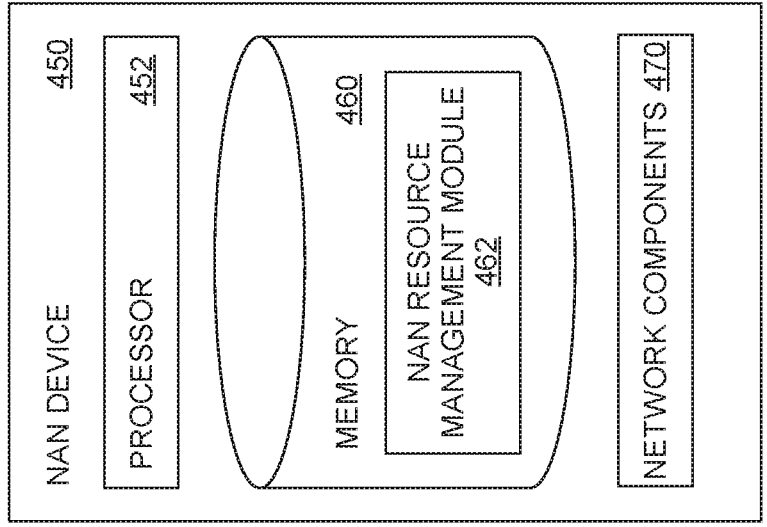
FIG. 4 is a block diagram illustrating an AP and a NAN device in a hybrid infrastructure WLAN and NAN network, according to one embodiment described herein.
Figure 4:
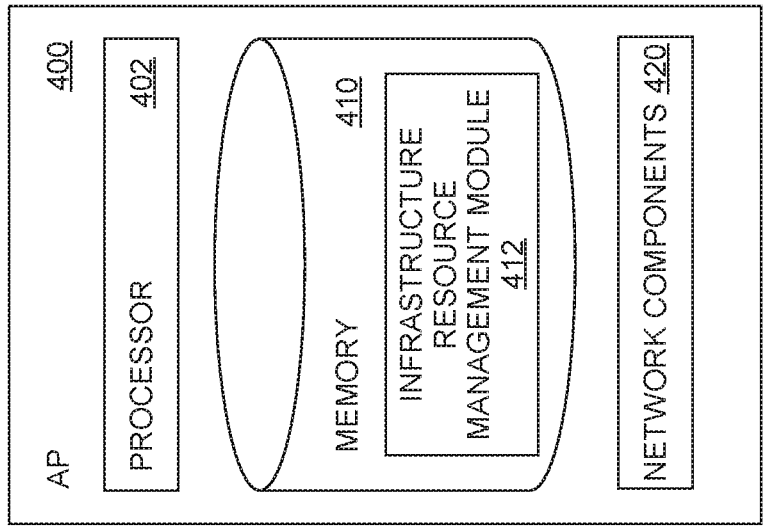

FIG. 4 is a block diagram illustrating an AP and a NAN device in a hybrid infrastructure WLAN and NAN network, according to one embodiment described herein. The AP 400 includes a processor 402, a memory 410, and network components 420. The processor 402 generally retrieves and executes programming instructions stored in the memory 410. The processor 402 is included to be representative of a single central processing unit (CPU), multiple CPUs, a single CPU having multiple processing cores, graphics processing units (GPUs) having multiple execution paths, and the like.

The network components 420 include the components necessary for the AP 400 to interface with a wireless communication network, as discussed above in relation to FIGS. 1-3. For example, the network components 420 can include WiFi or cellular network interface components and associated software. Although the memory 410 is shown as a single entity, the memory 410 may include one or more memory devices having blocks of memory associated with physical addresses, such as random access memory (RAM), read only memory (ROM), flash memory or other types of volatile and/or non-volatile memory. The memory 410 generally includes program code for performing various functions related to use of the AP 400. The program code is generally described as various functional "applications" or "modules" within the memory 410, although alternate implementations may have different functions and/or combinations of functions. Within the memory 410, the infrastructure resource management module 412 manages data transmission and resource management for the AP in a hybrid infrastructure WLAN and NAN network, as discussed further in relation to FIG. 5 and after.

The NAN device 450 includes a processor 452, a memory 460, and network components 470. The processor 452 generally retrieves and executes programming instructions stored in the memory 460. The processor 452 is included to be representative of a single central processing unit (CPU), multiple CPUs, a single CPU having multiple processing cores, graphics processing units (GPUs) having multiple execution paths, and the like.

The network components 470 include the components necessary for the NAN device 450 to interface with a wireless communication network, as discussed above in relation to FIGS. 1-3. For example, the network components 470 can include WiFi or cellular network interface components and associated software. Although the memory 460 is shown as a single entity, the memory 460 may include one or more memory devices having blocks of memory associated with physical addresses, such as random access memory (RAM), read only memory (ROM), flash memory or other types of volatile and/or non-volatile memory. The memory 460 generally includes program code for performing various functions related to use of the NAN device 450. The program code is generally described as various functional "applications" or "modules" within the memory 460, although alternate implementations may have different functions and/or combinations of functions. Within the memory 460, the NAN resource management module 462 manages data transmission and resource management for the NAN device in a hybrid infrastructure WLAN and NAN network, as discussed further in relation to FIG. 5 and after.

Figure 5:
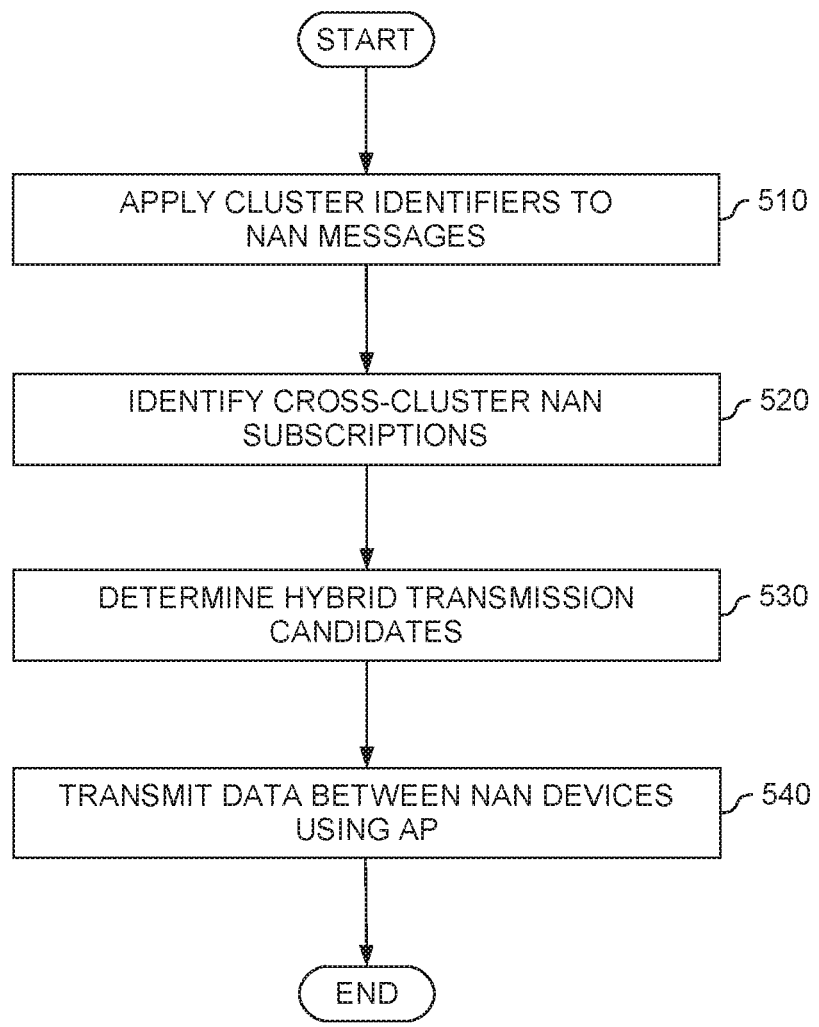
FIG. 5 is a flowchart further illustrating data communication in a hybrid infrastructure WLAN and NAN network, according to one embodiment described herein.
Figure 6A:
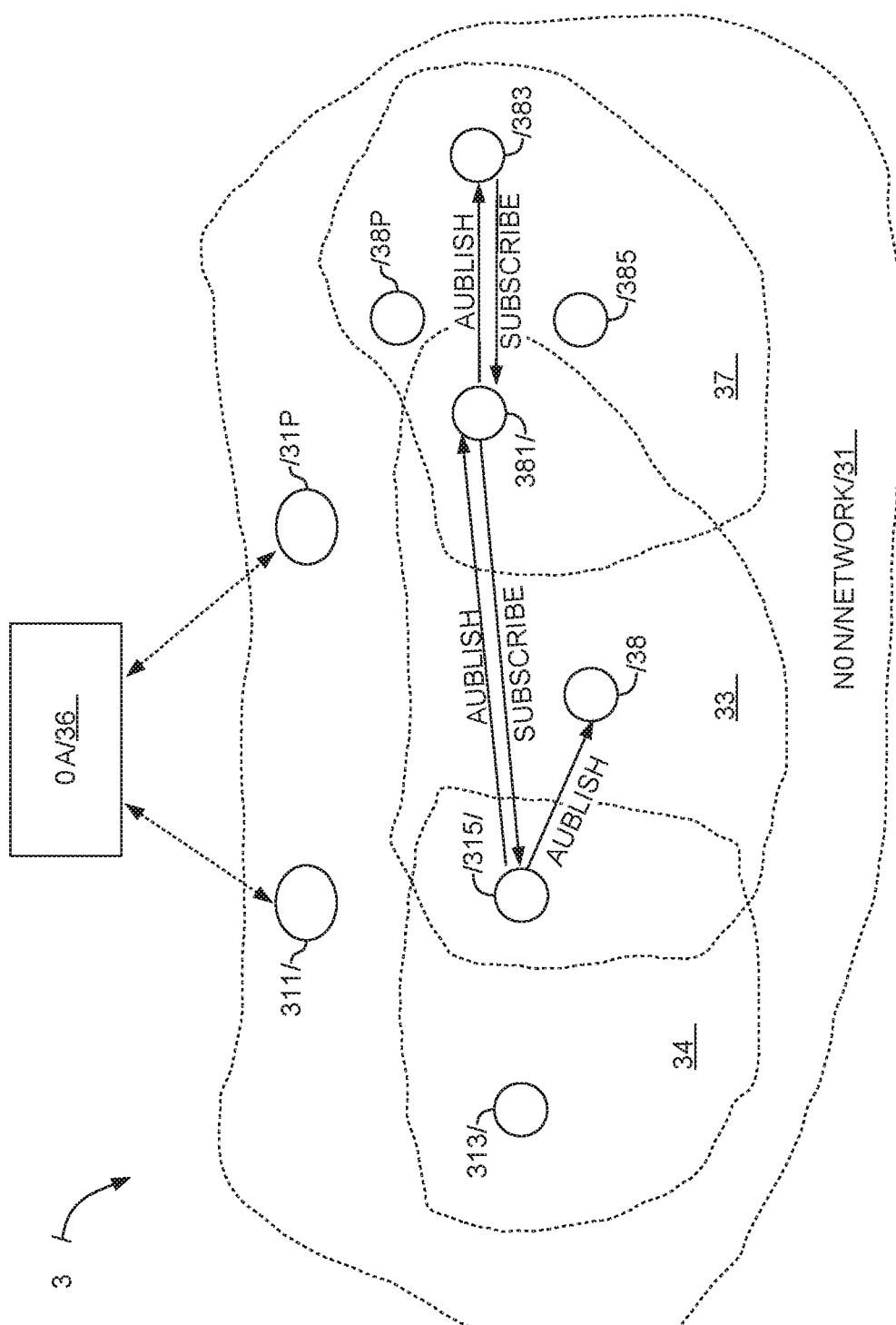
FIGS. 6A-B further illustrate data communication in a hybrid infrastructure WLAN and NAN network, according to one embodiment described herein.
Figure 6B:
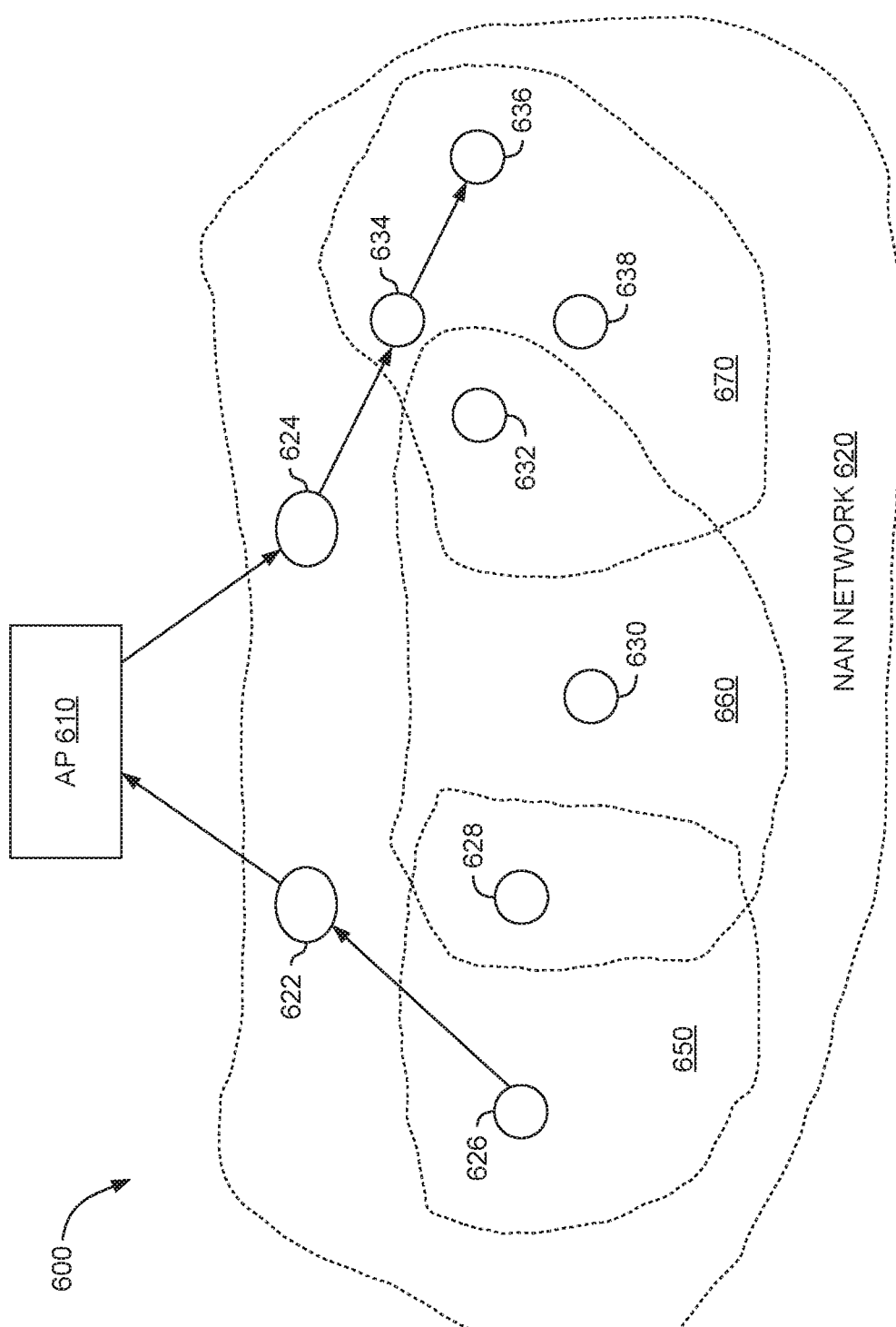

FIG. 5 is a flowchart illustrating data communication in a hybrid infrastructure WLAN and NAN network, according to one embodiment described herein. FIGS. 6A-B illustrate data communication in a hybrid infrastructure WLAN and NAN network (e.g., as illustrated in FIG. 5), according to one embodiment described herein. In an embodiment, FIGS. 5 and 6 disclose techniques to facilitate improved data communication in a hybrid infrastructure WLAN and NAN network. These figures will be discussed together.

Starting with FIG. 5, at block 510 NAN resource management modules (e.g., the NAN resource management module 462 illustrated in FIG. 4) in NAN devices apply cluster identifiers to NAN messages. In an embodiment, cluster identifiers can be appended to NAN publish messages to identify the NAN cluster in which the service is available. This allows for tracking of cross-cluster NAN subscriptions, and allows for improved data communication between clusters (e.g., using an AP to facilitate communication).

For example, as illustrated in FIG. 6A, a NAN network 620 includes three NAN clusters: a NAN cluster 650, a NAN cluster 660, and a NAN cluster 670. In this illustration, the NAN device 636 is located in the NAN cluster 670, but subscribes to a service offered by the NAN device 628 located in the NAN cluster 650. In an embodiment, the publish message from the NAN device 628 to the NAN device 632 can include a cluster identifier specifying that the NAN device 628 is part of the NAN cluster 650 and the NAN cluster 660, and therefore the services offered by the NAN device 628 are offered within the NAN clusters 650 and 660. The NAN device 632 can forward this information in the publish message form the NAN device 632 to the NAN device 636. In this way, the NAN device 636 can discern that the services offered by the NAN device 628 are offered within the NAN clusters 650 and 660. This further allows the NAN device 636 to determine the number of clusters that need to be traversed to communicate data between the NAN device 628 and the NAN device 636. In an embodiment, a NAN device 630 is included in the NAN cluster 660, and NAN devices 634 and 638 are included in the NAN cluster 670.

Returning to FIG. 5, at block 520 the NAN resource management modules in NAN devices identify cross cluster NAN subscriptions. For example, as illustrated in FIG. 6A, the NAN device 636 can use the cluster identifiers in the publish messages to determine that a subscription to a service offered by the NAN device 628 is cross cluster. Further, subscribe messages (e.g., from the NAN device 636 to the NAN device 632 and from the NAN device 632 to the NAN device 628) can also include cluster identifiers. This allows the NAN device 628 to determine that a subscription by the NAN device 636 is cross cluster.

Further, the network 600 includes an AP 610 and STAs 622 and 624 associated with the AP 610. Using existing NAN techniques the network 600 can set the AP 610 or the STAs 622 or 624 as the NAN anchor master of each NAN cluster 650, 660, and 670. This can be done using suitable values of NAN parameters for these devices. With this, the network 600 can the use existing NAN techniques to determine hop-count information from each NAN device to its NAN anchor master.

Returning to FIG. 5, at block 530 the NAN resource management modules in NAN devices determine hybrid transmission candidates. For example, as illustrated in FIG. 6A, when the NAN device 626 seeks to transmit data to the NAN device 636, the NAN resource management module in the NAN device 626 can identify the number of clusters between it and the NAN device 636. If the number of clusters is above a given threshold, then transmission between the NAN device 626 and the NAN device 636 is a potential candidate for hybrid transmission (e.g., using the AP 610 to facilitate transmission). Further, the NAN resource management module in the NAN device 626 can identify the number of hops to its NAN anchor master (e.g., the AP 610) and determine whether this number of hops falls below a threshold.

In an embodiment, these thresholds are statically configured (e.g., by a user, or by a NAN system developer). Alternatively, the thresholds are dynamically adapted using performance parameters (e.g., transmission times or re-transmission attempts). For example, the NAN resource management module can modify the thresholds as the number of devices in the NAN network 620 increases. Further, in an embodiment, the NAN resource management module can evaluate the channel quality of the potential hybrid path (e.g., through the AP 610) using a probe message or by using existing messages that get exchanges between these devices. If all of these checks succeed, the NAN resource management module in the NAN device 626 (or any other suitable module, including a module in the NAN anchor master associated with the NAN device 626) determines that hybrid transmission is suitable between the NAN device 626 and the NAN device 636.

Turning back to FIG. 5, at block 540 the NAN resource management module transmits data between the NAN devices using the AP. For example, as illustrated in FIG. 6B, the NAN device 626 can transmit data to the NAN device 636 using the AP 610. As illustrated, this allows for faster transmission across fewer network hops. Further, the AP 610 can be configured to apply network services and improve data transmission.

Figure 7:
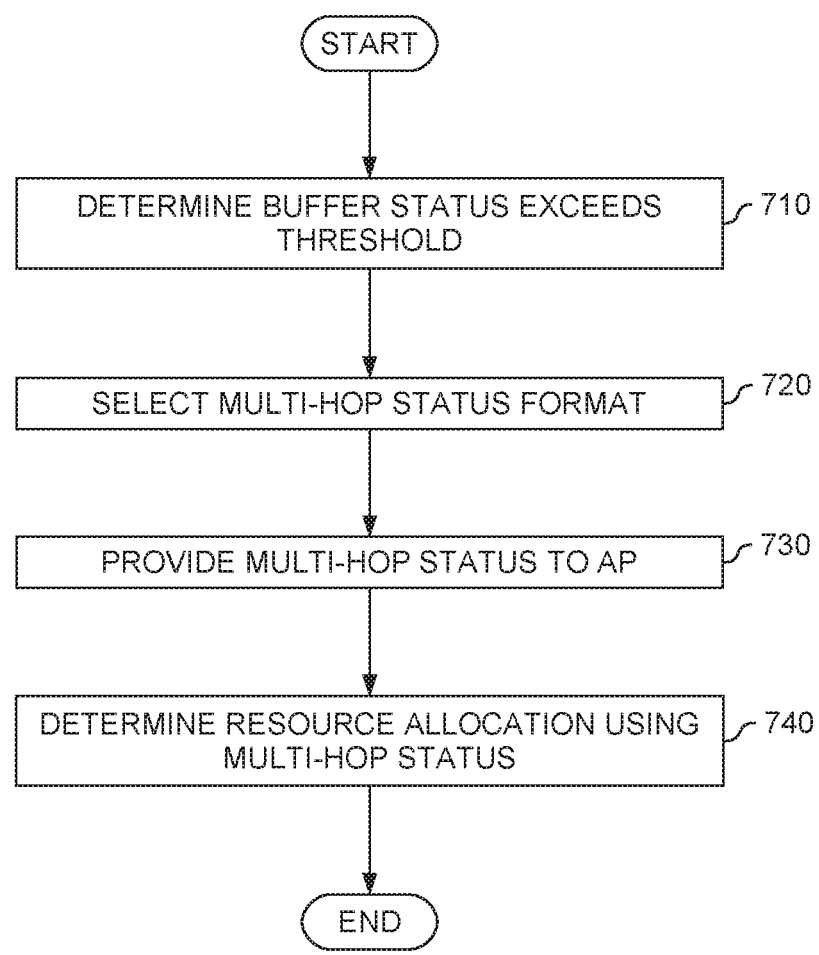
FIG. 7 is a flowchart illustrating resource allocation in a hybrid infrastructure WLAN and NAN network, according to one embodiment described herein.
Figure 8A:
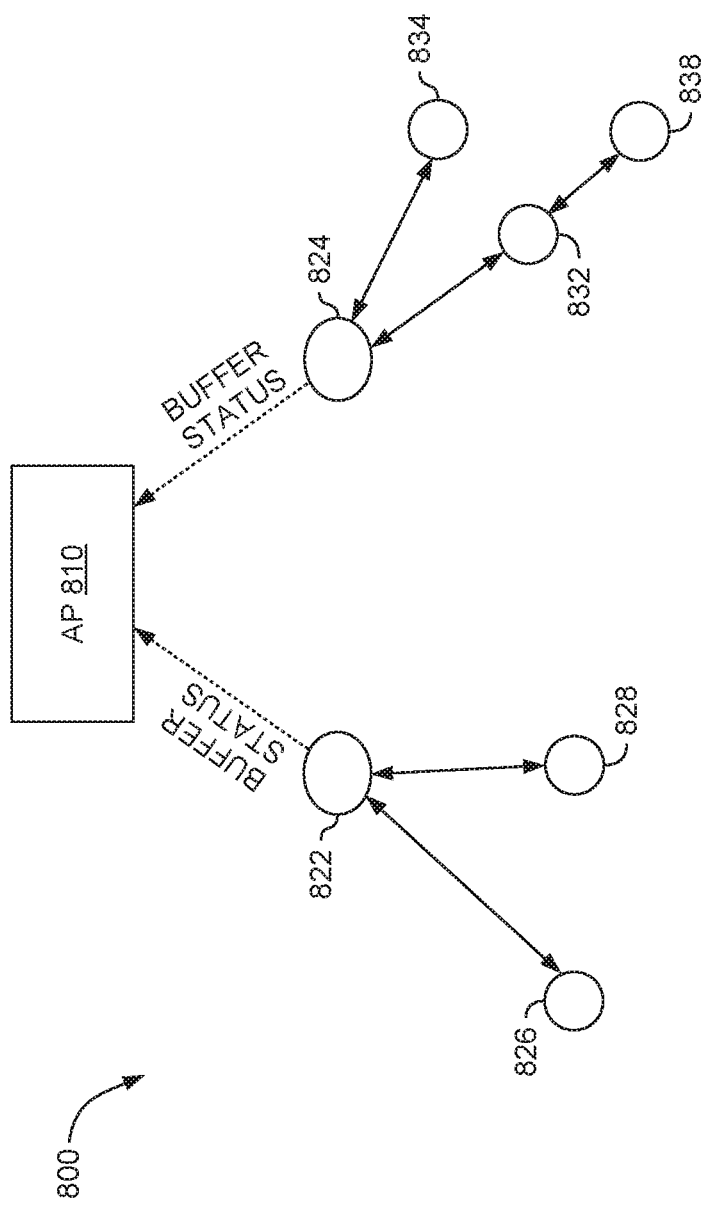
FIGS. 8A-B illustrate resource allocation in a hybrid infrastructure WLAN and NAN network, according to one embodiment described herein.
Figure 8B:
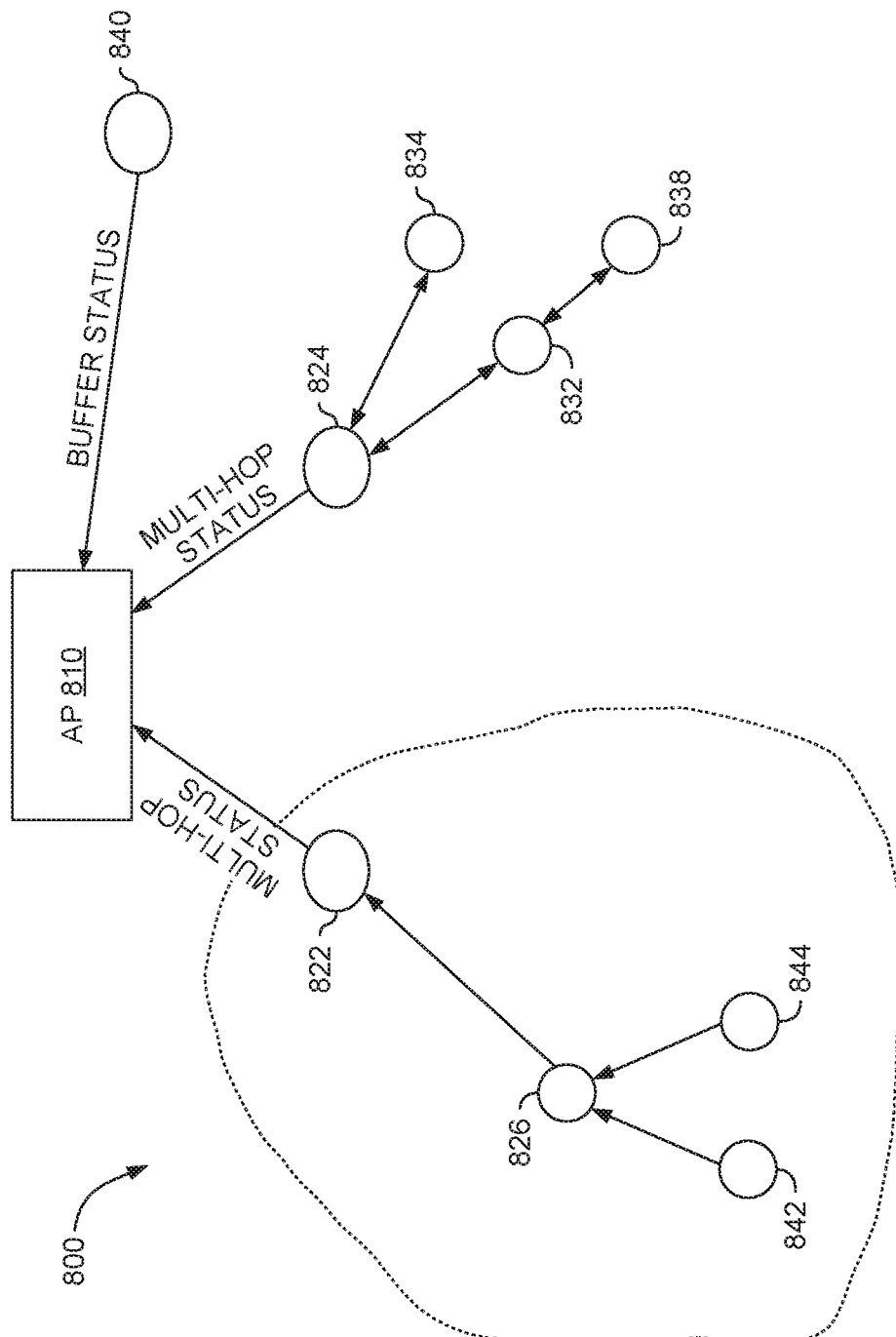

FIG. 7 is a flowchart illustrating resource allocation in a hybrid infrastructure WLAN and NAN network, according to one embodiment described herein. FIGS. 8A-B illustrate resource allocation in a hybrid infrastructure WLAN and NAN network (e.g., as illustrated in FIG. 7), according to one embodiment described herein. These Figures will be discussed together. As illustrated in FIG. 8A, a network 800 includes an AP 810, STAs 822 and 824, and NAN devices 826, 828, 832, 834, and 838. In an embodiment, the STAs 822 and 824 are also NAN devices.

In an infrastructure WLAN network (e.g. with 802.11ax), an AP (e.g., the AP 810) can use a buffer status indication (e.g., the status of pending packets) from client STAs (e.g., the STAs 822 and 824), along with various other parameters, make quality of service (QoS) scheduling decisions. The AP 810 can get this buffer status indication from the STAs 822 and 824 via solicited and unsolicited techniques. In one example solicited technique, the AP 810 can send an explicit trigger, called a buffer status report poll (BSRP) to the client STAs 822 and 824. The STAs 822 and 824 respond by providing the AP 810 with their buffer status. In an embodiment, the AP 810 can also support aggregated buffer status or per-class buffer status for client STAs.

In an embodiment, however, this buffer status is provided by infrastructure WLAN client STAs only. For example, the AP 810 can use these techniques to determine the buffer status of the STAs 822 and 824, but not of the NAN devices 826, 828, 832, 834, and 838. As illustrated in FIG. 8A, the STAs 822 and 824 provide their buffer status to the AP 810. In an embodiment, FIGS. 7-8 related to techniques to provide buffer status and other parameters from the NAN devices to the AP 810, to facilitate scheduling and resource management by the AP 810.

As illustrated in FIG. 7, at block 710 the NAN resource management module (e.g., the NAN resource management module 462 illustrated in FIG. 4) in a NAN device (e.g., the NAN device 826 illustrated in FIG. 8) determines whether the buffer status at the NAN device exceeds a threshold. In an embodiment, the buffer status techniques illustrated in FIGS. 7 and 8 are only used in certain circumstances. For example, these techniques are used if the buffer status at a NAN device exceeds a threshold (e.g., too many packets are stored in the buffer of the NAN device). In an embodiment, this threshold is pre-determined. As another example, these techniques are used if the NAN device has packets pending that relate to a delay sensitive application.

At block 720 the NAN resource management module in the NAN device selects the multi-hop status format. In an embodiment, the multi-hop status indicates the buffer status of the NAN device (e.g., the NAN device 826). This status can be provided to the AP 810 (e.g., as illustrated in FIG. 8C and discussed further below) in multiple different formats:

| Type | Format |
|---|---|
| I | Aggregate buffer status of NAN devices for which STA acts as NAN master or anchor master |
| II | Per-QoS class buffer status of NAN devices for which STA acts as NAN master or anchor master |
| III | (Buffer status, Hop count) Tuples for NAN devices for which STA acts as NAN master or anchor master |
| IV | (Buffer status, Hop count, QoS class) Tuples for NAN devices for which STA acts as NAN master or anchor master |

In one embodiment, the NAN resource management module selects the format based on one or more characteristics of the network. For example, to keep overhead limited, in a lightly loaded network that does not include latency critical apps at NAN devices, the NAN resource management module uses Type I status messages. As some latency critical apps start at some NAN devices, the NAN resource management module uses Type II status messages. The NAN resource management module switches to type III (and IV) as more devices join the NAN cluster. In an embodiment, the status messages can indicate some or all of buffer depth, QoS class, hop count, and the presence/absence of latency critical data at NAN devices.

At block 730 the NAN resource management module in the NAN device provides the multi-hop status to the AP. In an embodiment, this is done using a new frame transmission from the STAs to the AP. For example, as illustrated in FIG. 8B the STA 822 collects the multi-hop status from the NAN devices 826, 842, and 844. In an embodiment, this can done using the NAN publish/subscribe process (e.g., as described above for cluster identifiers in relation to FIGS. 5-6). The STA 822 provides the multi-hop status, according to the format type selected at block 720, to the AP 810. Similarly, the STA 824 provides the multi-hop status for the NAN devices 832, 834, and 838 to the AP 810. In an embodiment, the network 800 includes an additional STA 840, which provides its own buffer status but which is not associated with NAN devices. In an embodiment, the AP 810 can use these messages to determine the network topology (e.g., the number of hops between various NAN devices), and to allocate resources.

At block 740, an AP resource management module (e.g., the AP resource management module 412 illustrated in FIG. 4) determines resource allocation for the network 800 using the multi-hop status. In an embodiment, prior APs in hybrid infrastructure WLAN and NAN networks base resource management on the buffer status from infrastructure WLAN STAs (e.g., the STAs 822 and 824) and other parameters for those STAs. But the prior APs do not have access to the multi-hop status for NAN devices and do not have access to the NAN network topology. In an embodiment, at block 740 the AP 810 allocates resources among the various network devices based on any (or all) of: (i) buffer status of infrastructure WLAN STAs (e.g., the STAs 822 and 824), (ii) the multi-hop status of STAs (e.g., the STAs 822 and 824) and NAN devices (e.g., the NAN devices 826, 842, 844, 832, 834, and 838), (iii) the network topology of the STAs and the NAN devices, (iv) and other parameters for the STAs and NAN devices. In an embodiment, the AP resource management module can select frequency channels, power, resource blocks, modulation and coding schemes etc.

In an embodiment, the AP resource management module takes into account both the current network requirements and likely future requirements (e.g., based on the NAN network topology). This allows the AP 810 to allocate more resources for delay sensitive applications from particular devices at particular times, based on predictions about when the AP 810 will have to serve NAN traffic from NAN devices via an infrastructure WLAN STA. This allows for more efficient resource management to meet latency requirements for infrastructure WLAN as well as NAN devices. In empirical testing, this can result in significant improvement in the time necessary to empty the buffer for the various network devices (e.g., between 10% and 30% improvement, depending on network topology and other factors).

Figure 9:
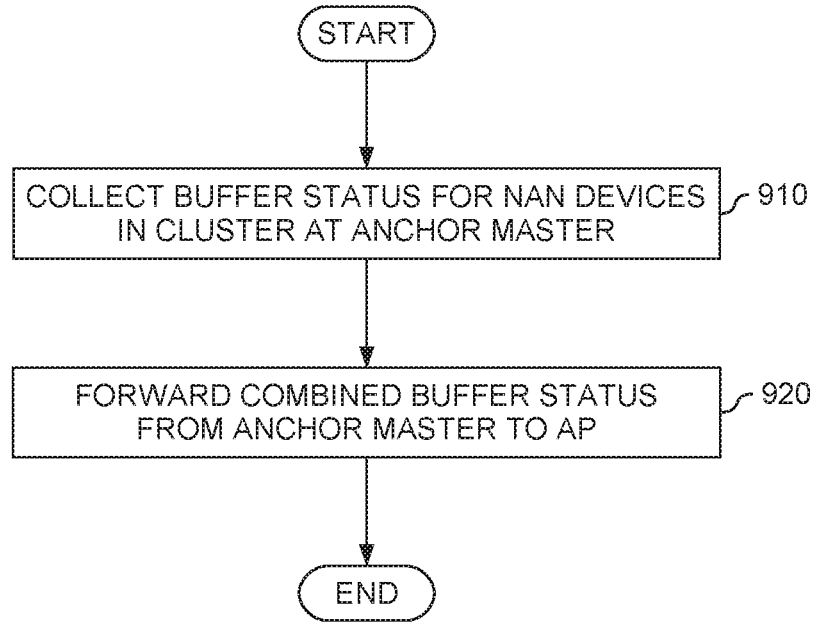
FIG. 9 is a flowchart further illustrating resource allocation in a hybrid infrastructure WLAN and NAN network, according to one embodiment described herein.
Figure 10:
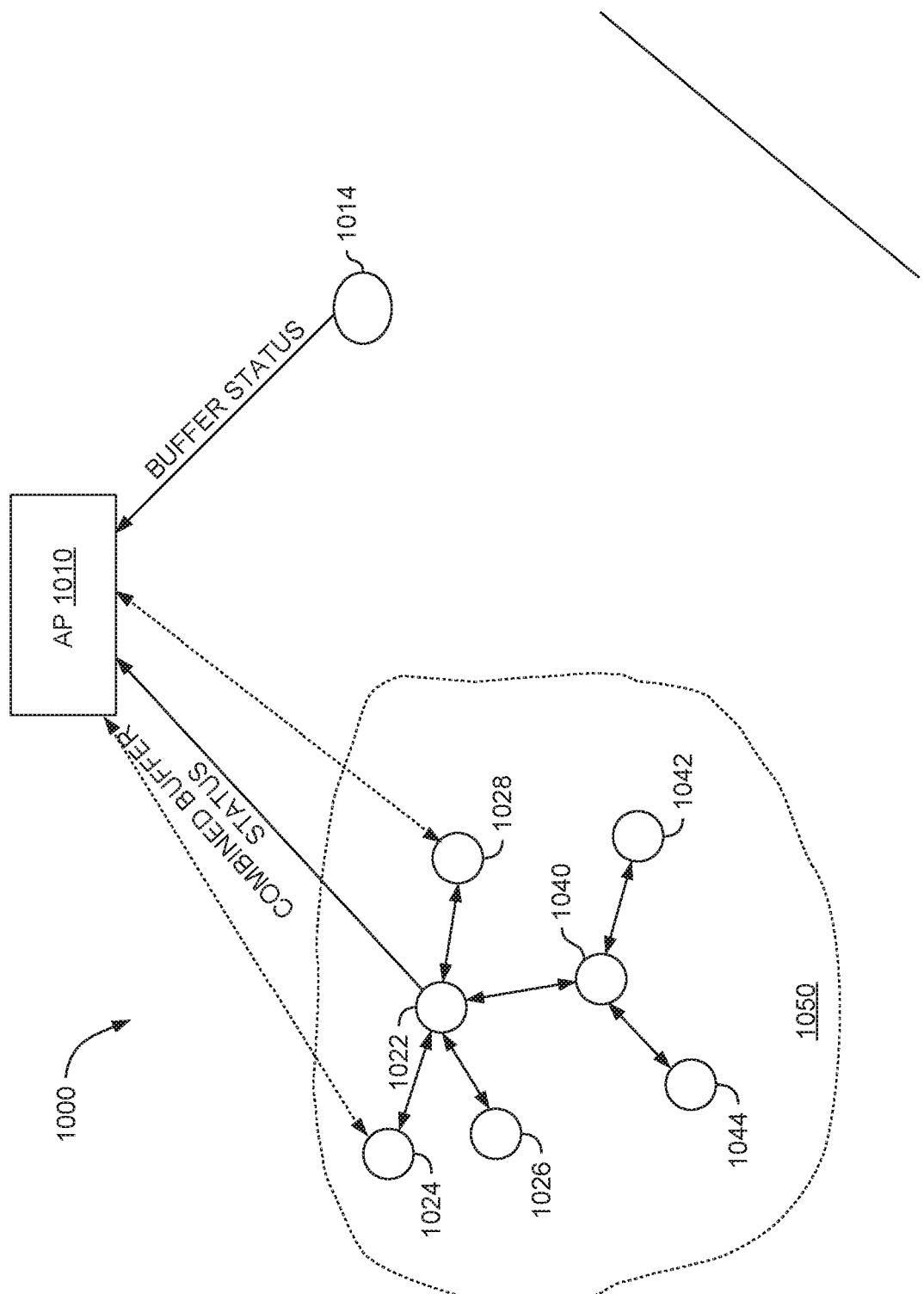
FIG. 10 further illustrates resource allocation in a hybrid infrastructure WLAN and NAN network, according to one embodiment described herein.

FIG. 9 is a flowchart illustrating resource allocation in a hybrid infrastructure WLAN and NAN network, according to one embodiment described herein. FIG. 10 further illustrates resource allocation in a hybrid infrastructure WLAN and NAN network 1000 (e.g., as illustrated in FIG. 9), according to one embodiment described herein. These Figures are discussed together.

At block 910, an STA acting as an anchor master for a NAN cluster (e.g., the STA 1022 illustrated in FIG. 10) collects buffer status for NAN devices in its cluster. As discussed above in relation to FIGS. 7-8, in an embodiment an AP (e.g., the AP 1010 illustrated in FIG. 10) uses buffer status information from client STAs for decisions related to resource management. There is signaling overhead, however, associated with transmitting buffer status information to the AP 1010. As the number of devices in the network increases (e.g., as the number of NAN devices increases), the number of messages transmitted to the AP increases.

This can be improved by collecting the buffer status information (e.g., the multi-hop status discussed above with regard to FIGS. 7-8) for a given NAN cluster at the anchor master for that cluster. For example, as illustrated in FIG. 10, the STA 1022 can act as the anchor master for a NAN cluster including the NAN devices 1024, 1026, 1028, 1040, 1042, and 1044. Note that some of these devices (e.g. STA 1024, 1022 and 1028) could be working in NAN as well as infrastructure modes. The STA 1022 can collect the multi-hop status for each of these NAN devices. This helps to reduce signaling overhead and less time is spent (by the AP) in collecting buffer status information. That time can be used to improve data plane communication.

Returning to FIG. 9, at block 920 the anchor master forwards the combined buffer status to the AP. As illustrated in FIG. 10, the STA 1022 forwards the combined buffer status for the NAN devices in the NAN cluster 1050 (e.g., the NAN devices 1024, 1026, 1028, 1040, 1044, and 1042) to the AP 1010. In an embodiment, this can be transmitted from the STA 1022 to the AP 1010 using typical infrastructure WLAN mechanisms. In an embodiment, a separate channel is not used for NAN related communication, but specific resource units (RUs) can be used in 802.11ax type of WLAN networks. Alternatively, a separate channel can be allocated in other WLAN networks. In an embodiment, the STA 1022 receives (and forwards) the combined buffer status based on certain events (e.g., if packets are pending for a latency sensitive application at a device).

Figure 11:
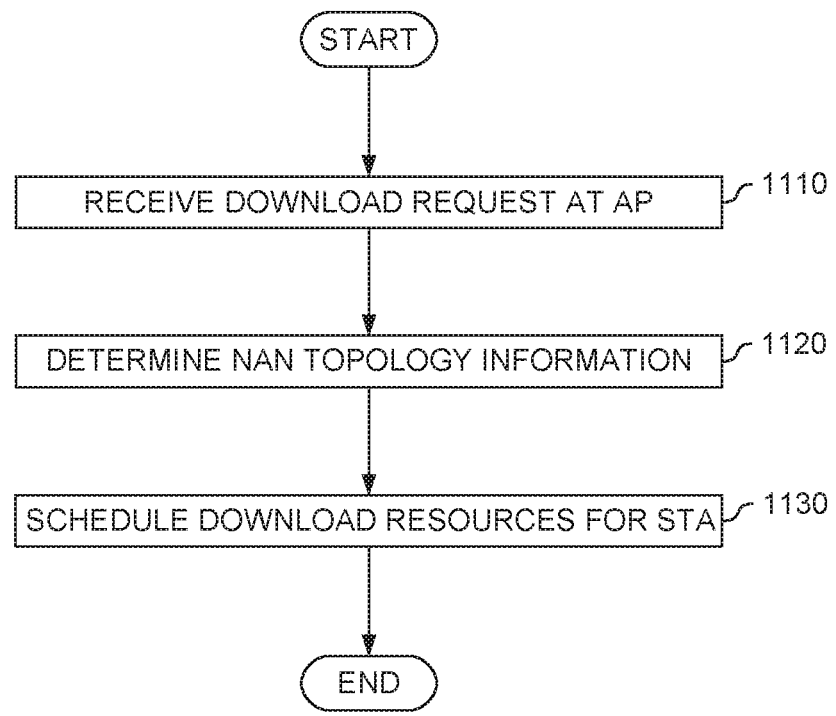
FIG. 11 is a flowchart illustrating download resource scheduling in a hybrid infrastructure WLAN and NAN network, according to one embodiment described herein.

FIG. 11 is a flowchart illustrating download resource scheduling in a hybrid infrastructure WLAN and NAN network, according to one embodiment described herein. In an embodiment, the techniques illustrated in FIGS. 5-10 are used for upload resource scheduling and upload data communication. In an embodiment, these techniques can also be used to improve download resource scheduling and download data communication. At block 1110, an AP resource management module (e.g., the AP resource management module 412 illustrated in FIG. 4) receives a download request from an STA.

At block 1120, the AP resource management module determines the network topology. In an embodiment, this can be done using the techniques illustrated in FIGS. 5-10. For example, the AP resource management module can determine whether or not a client STA is part of a NAN cluster, the number of NAN devices for which a client STA is acting as NAN master or Anchor Master, and the hop count of these NAN devices.

At block 1130, the AP resource management module uses this topology to schedule download resources for the STA. In an embodiment, the AP resource management module can schedule resources for two types of STAs. The first type of STA is associated with the AP only, and is not acting as a NAN master or anchor master (e.g., the STA 1014 illustrated in FIG. 10). The second type of STA is both associated with the AP, and acting as a NAN master or anchor master (e.g., the STA 1022 illustrated in FIG. 10). The AP resource management module can allocate additional resources for the second type of STA, particularly when the AP resource management module determines it has delay sensitive data for this STA and if some of this data is destined for NAN devices via this STA.

Figure 12:
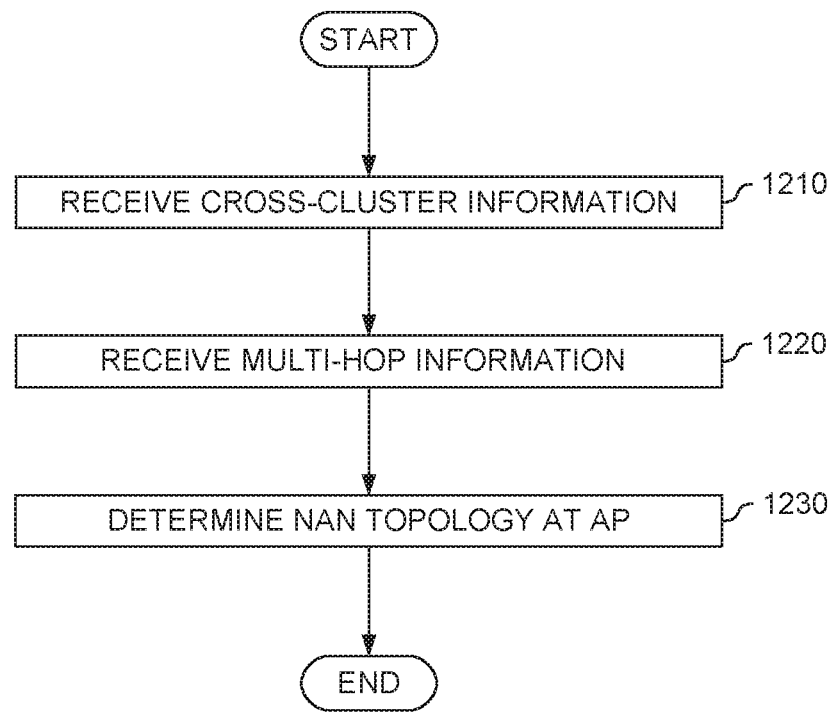
FIG. 12 is a flowchart illustrating determining network topology in a hybrid infrastructure WLAN and NAN network, according to one embodiment described herein.

FIG. 12 is a flowchart illustrating determining network topology in a hybrid infrastructure WLAN and NAN network, according to one embodiment described herein. At block 1210, an AP resource management module (e.g., the AP resource management module 412 illustrated in FIG. 4) receives cross-cluster information for STAs and NAN devices in the network. As discussed above with regard to FIGS. 5-6, cluster identifiers can be included in NAN publish and subscribe messages, and used to identify cross-cluster subscriptions in the NAN network. This information is provided to the AP at block 1210.

At block 1220, the AP resource management module receives multi-hop information for NAN devices in the network. As discussed above with regard to FIGS. 7-10, multi-hop status information can be gathered in the NAN network and provided to the AP. This information is received at block 1220. At block 1230, the AP resource management module uses this cross-cluster and multi-hop information (and other information, if available) to determine the topology of the NAN network. This can then be used to improve resource scheduling and data communication among devices in the network.

Figure 13:
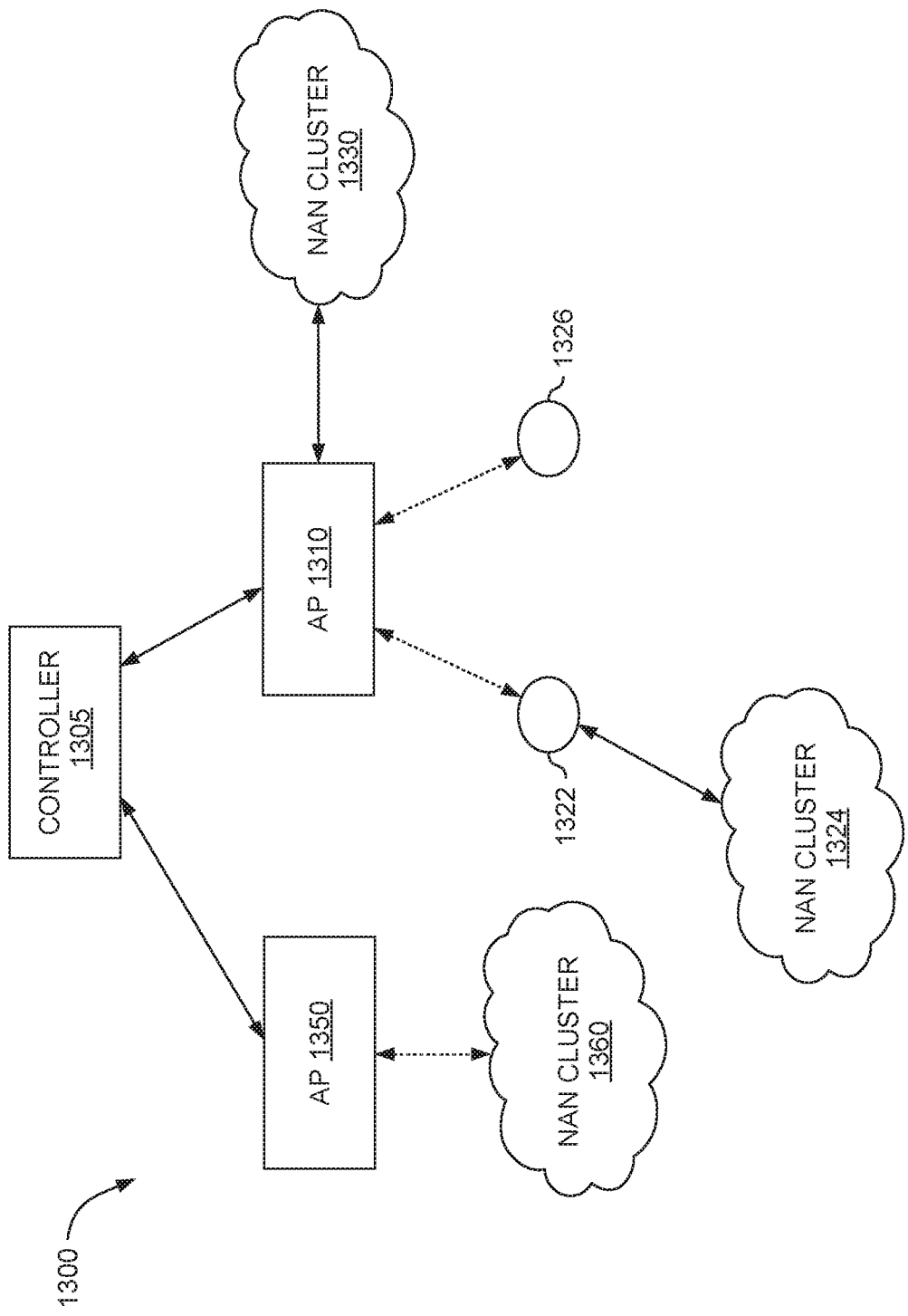
FIG. 13 illustrates network discovery in a hybrid infrastructure WLAN and NAN network, according to one embodiment described herein.

FIG. 13 further illustrates network discovery in a hybrid infrastructure WLAN and NAN network, according to one embodiment described herein. A hybrid infrastructure WLAN and NAN network 1300 includes a controller 1305. The controller 1305 is associated with two APs 1350 and 1310. The AP 1350 is associated with a NAN cluster 1360. For example, the AP 1350 can act as an anchor master for the NAN cluster 1360. The AP 1310 is associated with a NAN cluster 1330 (e.g., the AP 1310 can act as an anchor mater for the NAN cluster 1330). Further, the AP 1310 is associated with two STAs 1322 and 1326. The STA 1322 is associated with a NAN cluster 1324 (e.g., the STA 1322 can act as an anchor master for the NAN cluster 1324).

In an embodiment, the controller 1305 includes a NAN discovery module (NDM). For example, the NDM can be a software module stored in a memory on the controller 1305 and configured to facilitate discovery of the NAN network topology. In an embodiment, the AP 1350, the AP 1310, and the STA 1322 can also include an NDM. The NDM can be used, for example, to facilitate discovery of NAN network topology by WLAN infrastructure elements in the network.

In an embodiment, the NDM on the AP 1350 can provide the controller 1305 with NAN discovery parameters to use in discovering the NAN network topology for devices nearby to the AP 1350. For example, the AP 1350 can provide the controller 1305 with the location of client devices or APs near which a NAN cluster is detected. Further, the AP 1350 can provide the controller 1305 with a discovery window (e.g., detected using the techniques illustrated in FIGS. 5-12, above). The AP 1350 can further provide the controller 1305 with additional information about NAN clusters associated with the AP. For example, the AP 1350 can decode certain packets transmitted to and from the NAN cluster 1360, and can provide the controller 1305 with information about the NAN cluster 1360 based on these packets.

In an embodiment, an NDM can detect interference patterns or changes and can use this to identify NAN clusters and NAN network topology. For example, an NDM on the AP 1310 can detect an interference pattern (e.g., higher than usual interference in a particular window or over a particular channel) and can inform the controller 1305 of this interference pattern. The controller 1305 can then use his interference pattern to identify NAN clusters nearby to the AP 1310 and to discover the NAN network topology.

As another example, an NDM on the STA 1322 can identify an event denoting higher than usual interference in periodic time windows. The STA 1322 can provide to the AP 1310 information about the interference, the channel identifier, the length of the relevant time windows, the time period, the location of the device that detected the interference event, and any additional NAN information (e.g., information decoded from NAN packets). The AP 1310 can then forward this information to the controller 1305. Alternatively, the AP 1310 can analyze the information from the STA 1322 and identify the NAN network topology itself, or provide analyzed information to the controller 1305. Further, the STA 1322 can detect additional interference patters and inform the AP 1310 or the controller 1305.

Figure 14:
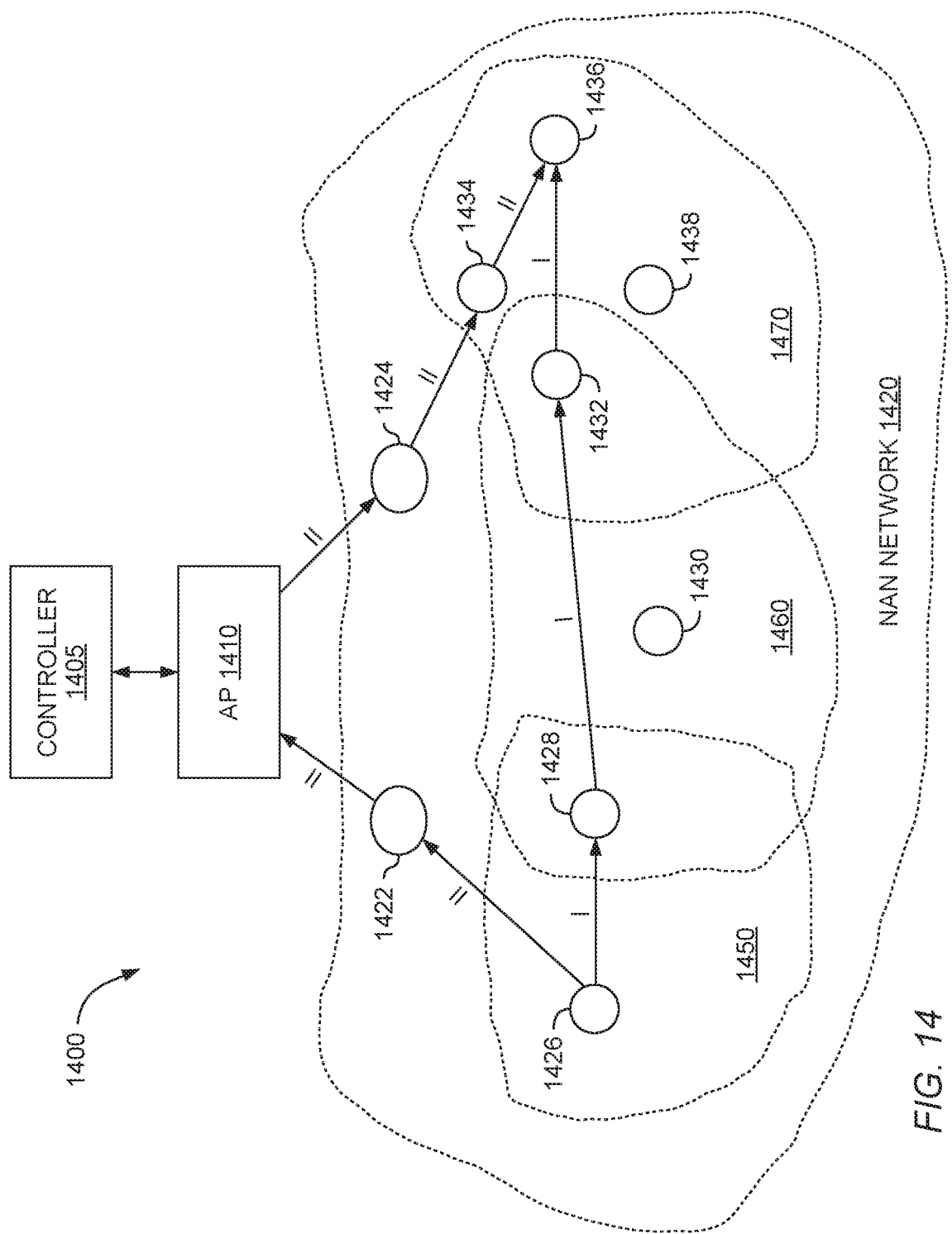
FIG. 14 illustrates network assisted path selection in a hybrid infrastructure WLAN and NAN network, according to one embodiment described herein.

FIG. 14 illustrates network assisted path selection in a hybrid infrastructure WLAN and NAN network 1400, according to one embodiment described herein. As discussed above with regard to FIGS. 5 and 6A-6B, in an embodiment an AP can be used to facilitate data transmission between two NAN devices in a NAN network 1420. For example, as illustrated in FIG. 14, data transmission between then NAN devices 1426 and 1436 can take two paths. In the path labeled I, data transmission flows from the NAN device 1426 in a NAN cluster 1450 to the NAN device 1428 in a NAN cluster 1460 to a NAN device 1432 in a NAN cluster 1470 to the NAN device 1436. In the path labeled II, data transmission flows from the NAN device 1426 to an STA 1422 to an AP 1410 to an STA 1424 to a NAN device 1434 to a NAN device 1436. The NAN cluster 1460 further includes an additional NAN device 1430, and the NAN cluster 1470 includes an additional NAN device 1438.

In certain circumstances, the path I may be preferred and in other circumstances the path II may be preferred. For example, using an AP in the path could impact the APs performance in other (non-NAN) network connections. Further, the NAN network topology could be such that a NAN-to-NAN connection, without use of an AP, is preferred. In an embodiment, the network 1400 (e.g., using the controller 1405) can select the preferred path. For example, the controller 1405 can include a routing module to select a path between NAN devices. In an embodiment, an access network bit can be used to identify the preferred path for a given packet. For example, if the access network bit is in one state (e.g., "0") the packet is transmitted along path I. If the access network bit is in the other state (e.g., "1") the packet is transmitted along path II. In one embodiment, the controller 1405 can select the appropriate path based on various network parameters, including the per-packet delay, the packet error rate, the data rate for each path, etc. Alternatively, as discussed below with regard to FIG. 15, the controller 1405 can use machine learning techniques to select a path.

Figure 15:
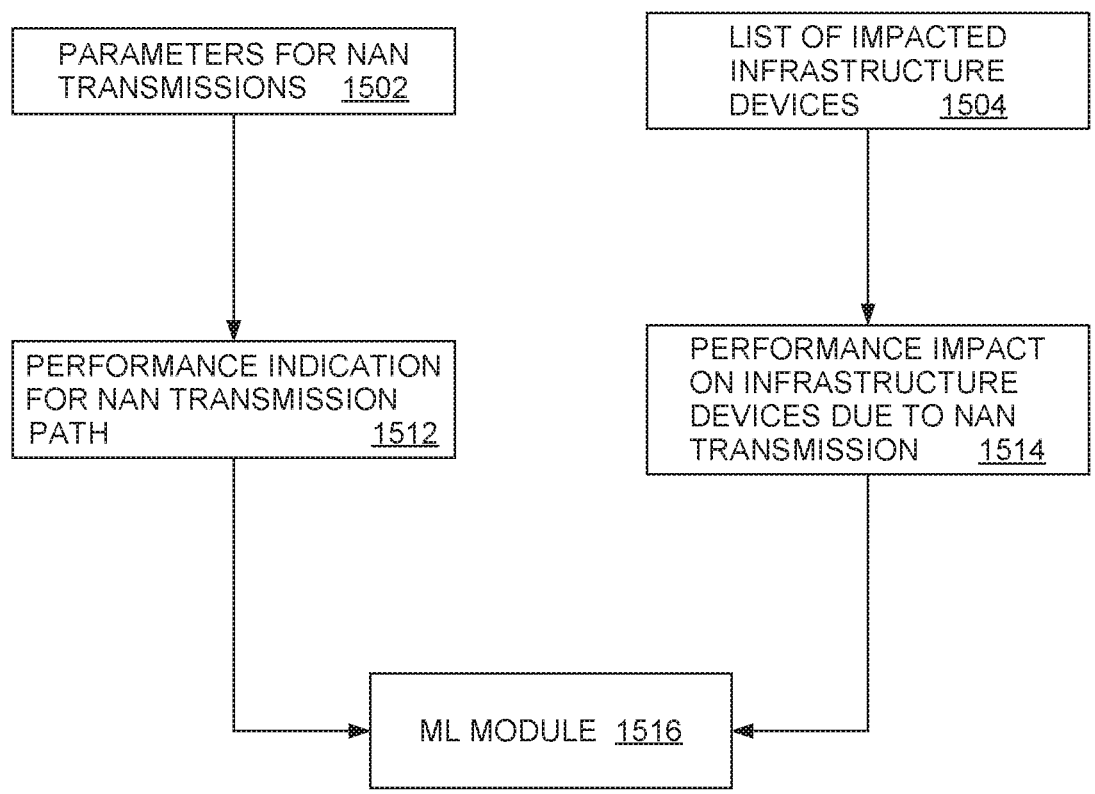
FIG. 15 illustrates machine learning techniques relating to network assisted path selection in a hybrid infrastructure WLAN and NAN network, according to one embodiment described herein.

FIG. 15 illustrates machine learning techniques relating to network assisted path selection in a hybrid infrastructure WLAN and NAN network, according to one embodiment described herein. In an embodiment, parameters 1502 related to NAN transmission are used to determine a performance indication 1512 for a NAN path. For example, for each transmission (over a particular time period) from a source NAN device to a destination NAN device, the parameters 1502 can include the type of path (e.g., using an AP or NAN only), the worst case delay, the average delay, the packet error rate, jitter, and the data rate. A performance indication 1512 for that path from the source NAN to the destination NAN can then be computed.

Further, a list of infrastructure devices 1504 impacted by the NAN transmission can be generated and used to determine the performance impact 1514 on the infrastructure devices from the NAN data transmission. For example, the list of impacted infrastructure devices can be determined using the techniques illustrated above. The performance impact on these devices can be determined for a given NAN source/destination, and a given time period.

The performance indication 1512 and the performance impact 1514 can then be provided to a machine learning model 1516 to determine a path score for a given path between a source and destination NAN device. In an embodiment, a suitable supervised machine learning model can be used. For example, a Support Vector Machine (SVM) or a Support Vector Regression (SVR) can be used. A suitable machine learning model can be trained using labeled or tagged data relating to NAN paths and network parameters. The trained model can then be provided with characteristics of the network, including the performance indication 1512 and the performance impact 1514, and can determine a path score for the relevant path. Further, in an embodiment, a controller (e.g., the controller 1405 illustrated in FIG. 14) can determine that a particular quality of connection is desired. This requirement can further be provided as an input to the ML model 1516 and used to identify the preferred path.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for routing data in a wireless communication network comprising a hybrid of infrastructure wireless local area network (WLAN) and neighbor awareness networking (NAN), the method comprising:
identifying a subscription between a first NAN device in a first NAN cluster in the wireless communication network and a second NAN device in a second NAN cluster in the wireless communication network, wherein the first NAN cluster comprises at least one NAN device not included in the second NAN cluster, and in response using a first network access point (AP) for routing data from the first NAN device in the first NAN cluster to the second NAN device in the second NAN cluster, comprising:
generating a first path between the first NAN device and the second NAN device, the first path comprising the first network AP; and
transmitting data from the first NAN device to the second NAN device using the first path comprising the first network AP.

2. The method of claim 1, wherein identifying the subscription between the first NAN device in the first NAN cluster in the wireless communication network and the second NAN device in the second NAN cluster in the wireless communication network further comprises:
receiving a first network message relating to the subscription between the first NAN device and the second NAN device;
identifying a first cluster identifier based on the first network message; and
determining, based on the first cluster identifier, that first NAN device is in the first NAN cluster.

3. The method of claim 2, wherein the first network message is one of a NAN publish message or a NAN subscribe message.

4. The method of claim 1, further comprising:
providing a first buffer status indication relating to the first NAN device to the first network AP; and
determining resource allocation for data transmission between the first NAN device and the first network AP, using the first network AP, based on the first buffer status.

5. The method of claim 4, further comprising:
determining that a first buffer status at the first NAN device exceeds a pre-determined threshold, and in response providing the first buffer status indication relating to the first NAN device to the first network AP.

6. The method of claim 4, wherein the first buffer status indication is a multi-hop status relating to a plurality of NAN devices associated with a first network station (STA), wherein the first STA is further associated with the first network AP.

7. The method of claim 6, further comprising:
selecting a format for the first buffer status indication from among a plurality of available formats, based on a characteristic of the wireless communication network.

8. The method of claim 1, further comprising:
receiving a plurality of buffer status messages related to a respective plurality of NAN devices at an STA associated with the first network AP;
generating a combined buffer status message at the STA based on the plurality of buffer status messages;
transmitting the combined buffer status message from the STA to the first network AP; and
determining resource allocation for data transmission relating to at least one of the plurality of NAN devices, using the first network AP, based on the combined buffer status message.

9. The method of claim 1, further comprising:
receiving a request at the first network AP to transmit data to a third NAN device;
determining a network topology relating to a plurality of NAN devices, including the third NAN device; and
determining resource allocation for data transmission to the third NAN device based on the determined network topology.

10. The method of claim 1, wherein generating the first path between the first NAN device and the second NAN device further comprises:
identifying a plurality of paths between the first NAN device and the second NAN device, the plurality of paths comprising the first path and a second path that does not include a network AP; and
selecting the first path.

11. The method of claim 10, wherein selecting the first path further comprises:
providing a plurality of parameters to a trained machine learning model, the plurality of parameters comprising transmission characteristics of the first path and a list of infrastructure devices impacted by the first path;

determining, using the trained machine learning model, a first path score relating to the first path and a second path score relating to the second path; and selecting the first path based on the first path score and the second path score.

12. A computer program product for routing data in a wireless communication network comprising a hybrid of infrastructure wireless local area network (WLAN) and neighbor awareness networking (NAN), the computer program product comprising:

a non-transitory computer-readable storage medium having computer-readable program code embodied therewith, the computer-readable program code executable by one or more computer processors to perform an operation, the operation comprising:

identifying a subscription between a first NAN device in a first NAN cluster in the wireless communication network and a second NAN device in a second NAN cluster in the wireless communication network, wherein the first NAN cluster comprises at least one NAN device not included in the second NAN cluster, and in response using a first network access point (AP) for routing data from the first NAN device in the first NAN cluster to the second NAN device in the second NAN cluster, comprising:

generating a first path between the first NAN device and the second NAN device, the first path comprising the first network AP; and transmitting data from the first NAN device to the second NAN device using the first path comprising the first network AP.

13. The computer program product of claim 12, wherein identifying the subscription between the first NAN device in the first NAN cluster in the wireless communication network and the second NAN device in the second NAN cluster in the wireless communication network further comprises:

receiving a first network message relating to the subscription between the first NAN device and the second NAN device;

identifying a first cluster identifier based on the first network message; and determining, based on the first cluster identifier, that first NAN device is in the first NAN cluster.

14. The computer program product of claim 12, the operation further comprising:

providing a first buffer status indication relating to the first NAN device to the first network AP; and determining resource allocation for data transmission between the first NAN device and the first network AP, using the first network AP, based on the first buffer status.

15. The computer program product of claim 12, wherein generating the first path between the first NAN device and the second NAN device further comprises:

identifying a plurality of paths between the first NAN device and the second NAN device, the plurality of paths comprising the first path and a second path that does not include a network AP;

providing a plurality of parameters to a trained machine learning model, the plurality of parameters comprising transmission characteristics of the first path and a list of infrastructure devices impacted by the first path;

determining, using the trained machine learning model, a first path score relating to the first path and a second path score relating to the second path; and selecting the first path based on the first path score and the second path score.

16. A system, comprising:

a processor; and a memory storing a program, which, when executed on the processor, performs an operation, the operation comprising:

identifying a subscription between a first NAN device in a first NAN cluster in a wireless communication network and a second NAN device in a second NAN cluster in the wireless communication network, wherein the first NAN cluster comprises at least one NAN device not included in the second NAN cluster, and in response using a first network access point (AP) for routing data from the first NAN device in the first NAN cluster to the second NAN device in the second NAN cluster, comprising generating a first path between the first NAN device and the second NAN device, the first path comprising the first network AP; and transmitting data from the first NAN device to the second NAN device using the first path comprising the first network AP.

17. The system of claim 16, wherein identifying the subscription between the first NAN device in the first NAN cluster in the wireless communication network and the second NAN device in the second NAN cluster in the wireless communication network further comprises:

receiving a first network message relating to the subscription between the first NAN device and the second NAN device;

identifying a first cluster identifier based on the first network message; and determining, based on the first cluster identifier, that first NAN device is in the first NAN cluster.

18. The system of claim 16, the operation further comprising:

providing a first buffer status indication relating to the first NAN device to the first network AP; and determining resource allocation for data transmission between the first NAN device and the first network AP, using the first network AP, based on the first buffer status.

19. The system of claim 16, the operation further comprising:

receiving a plurality of buffer status messages related to a respective plurality of NAN devices at an STA associated with the first network AP;

generating a combined buffer status message at the STA based on the plurality of buffer status messages;

transmitting the combined buffer status message from the STA to the first network AP; and determining resource allocation for data transmission relating to at least one of the plurality of NAN devices, using the first network AP, based on the combined buffer status message.

20. The system of claim 16, wherein generating the first path between the first NAN device and the second NAN device further comprises:

identifying a plurality of paths between the first NAN device and the second NAN device, the plurality of paths comprising the first path and a second path that does not include a network AP;

providing a plurality of parameters to a trained machine learning model, the plurality of parameters comprising transmission characteristics of the first path and a list of infrastructure devices impacted by the first path;

determining, using the trained machine learning model, a first path score relating to the first path and a second path score relating to the second path; and selecting the first path based on the first path score and the second path score.

* * * * *

UNITED STATES PATENT AND TRADEMARK OFFICE
CERTIFICATE OF CORRECTION

PATENT NO. : 10,966,138 B2
APPLICATION NO. : 16/380126
DATED : March 30, 2021
INVENTOR(S) : Mukesh Taneja et al.

Page 1 of 1

It is certified that error appears in the above-identified patent and that said Letters Patent is hereby corrected as shown below:

In the Drawings

On sheet 10 of 21, in Figure 6A, Line 4, delete "AUBLISH" and insert -- PUBLISH --.

On sheet 10 of 21, in Figure 6A, Line 4, delete "AUBLISH" and insert -- PUBLISH --.

On sheet 10 of 21, in Figure 6A, Line 6, delete "AUBLISH" and insert -- PUBLISH --.

On sheet 10 of 21, in Figure 6A, Line 8, delete "N0 N/NETWORK/31" and insert -- NAN NETWORK 620 --.

In the Specification

In Column 9, Line 41, after "can" insert -- be --.

Signed and Sealed this
Fourteenth Day of February, 2023

Katherine Kelly Vidal
*Director of the United States Patent and Trademark Office*